US011094032B2

(12) United States Patent
Du et al.

(10) Patent No.: US 11,094,032 B2
(45) Date of Patent: Aug. 17, 2021

(54) OUT OF ORDER WAVE SLOT RELEASE FOR A TERMINATED WAVE

(71) Applicant: QUALCOMM INCORPORATED, San Diego, CA (US)

(72) Inventors: Yun Du, San Diego, CA (US); Chun Yu, Rancho Santa Fe, CA (US); Andrew Evan Gruber, Arlington, MA (US); Zilin Ying, San Diego, CA (US); Baoguang Yang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/734,252

(22) Filed: Jan. 3, 2020

(65) Prior Publication Data

US 2021/0209717 A1   Jul. 8, 2021

(51) Int. Cl.
*G06T 1/20* (2006.01)
*G06T 11/00* (2006.01)

(52) U.S. Cl.
CPC .............. *G06T 1/20* (2013.01); *G06T 11/001* (2013.01)

(58) Field of Classification Search
CPC ....... G06T 1/20; G06T 11/001; G06F 9/3009; G06F 9/46; G06F 9/48

USPC .................................................. 345/501, 503
See application file for complete search history.

(56) References Cited

U.S. PATENT DOCUMENTS

| 2005/0172292 A1* | 8/2005 | Yamada | G06F 9/5077 718/105 |
| 2009/0172686 A1* | 7/2009 | Chen | G06F 9/4881 718/103 |
| 2010/0299499 A1* | 11/2010 | Golla | G06F 9/3824 712/206 |

* cited by examiner

*Primary Examiner* — Jacinta M Crawford
(74) *Attorney, Agent, or Firm* — Holland & Hart LLP

(57) ABSTRACT

Methods, systems, and devices for image processing are described. A device may determine, based on a test operation, to terminate a first wave associated with a first slot of a set of slots. The device may update a terminated wave bit associated with the first slot based on the determination to terminate the first wave. In some aspects, the device may update a number of invocations field associated with the first wave based on the determination to terminate the first wave. The device may release the first slot based on updating the terminated wave bit and the number of invocations field. In some examples, the device may output the number of invocations field to a rendering backend of the device based on the terminated wave bit.

20 Claims, 10 Drawing Sheets

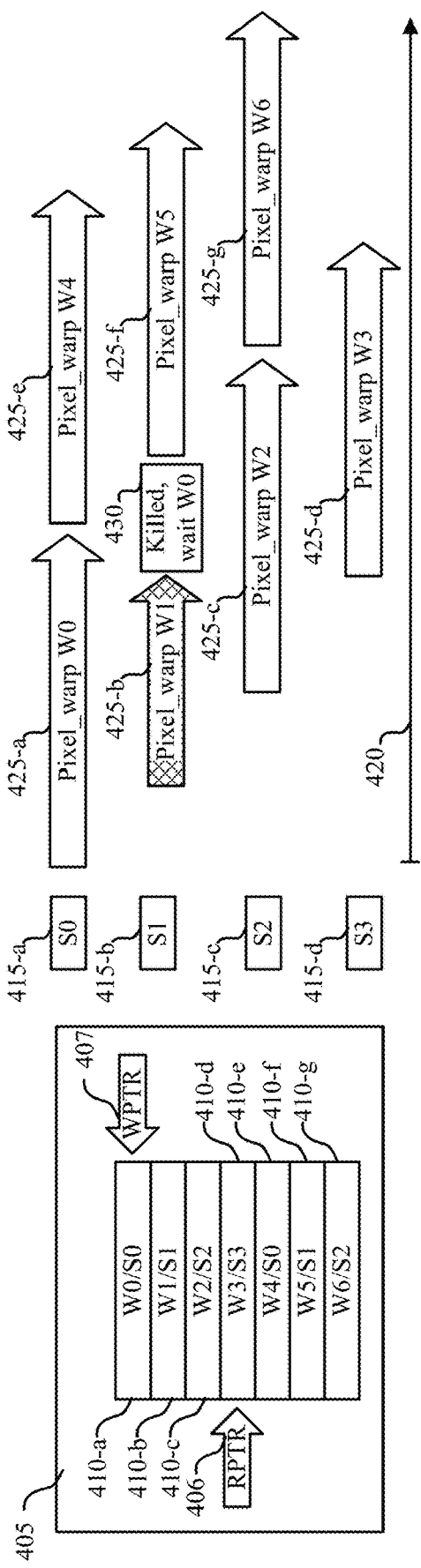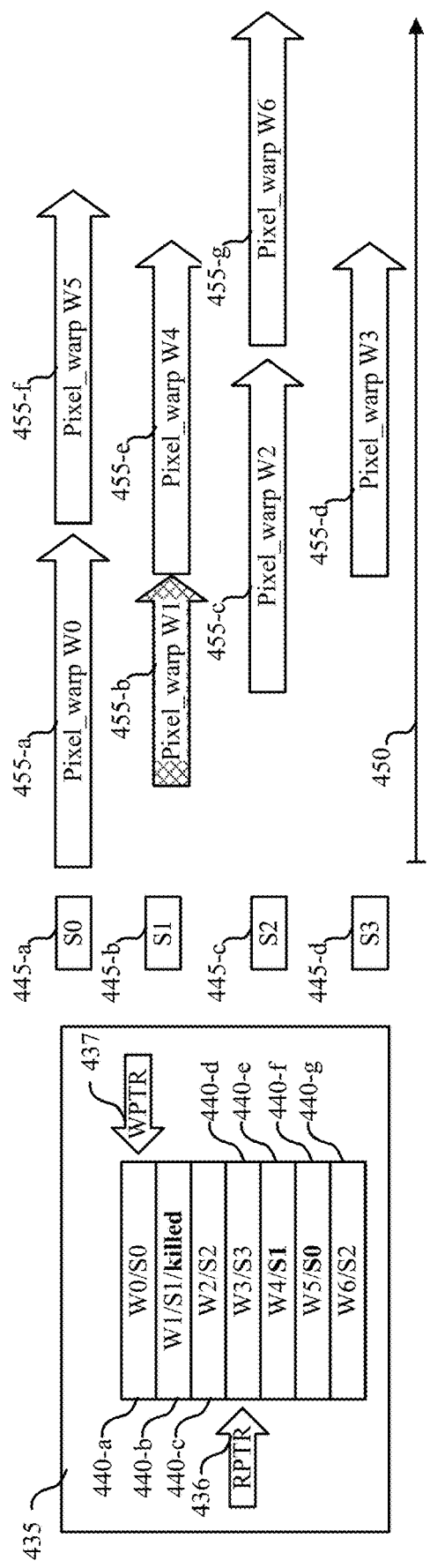
FIG. 4A
FIG. 4B

OUT OF ORDER WAVE SLOT RELEASE FOR A TERMINATED WAVE

BACKGROUND

The following relates generally to image processing, and more specifically to out of order wave slot release for a terminated wave.

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

For example, a graphics processing unit (GPU) may represent one or more dedicated processors for performing graphical operations. A GPU may be a dedicated hardware unit having fixed function and programmable components for rendering graphics and executing GPU applications. For example, a GPU may include a plurality of processing elements, which may allow the GPU to generate graphic images for display (e.g., for graphical user interfaces, for display of two-dimensional or three-dimensional graphics scenes, etc.).

SUMMARY

The described techniques relate to improved methods, systems, devices, and apparatuses that support out of order wave slot release for a terminated wave. For example, as discussed herein, graphics processing units (GPUs) may be parallel processors, capable of processing large amounts of data at the same time. In some cases, a GPU may implement a lot of threads (e.g., or pixels in pixel shader implementations) running the same shader. As such, threads (e.g., or pixels, workloads, etc.) may be batched in groups, which may be referred to as waves (e.g., or wavefronts, warps, etc.). A number of threads in a wave may be architecture dependent (e.g., architectures may implement 32 threads in a wave, 64 threads in a wave, etc.). All the threads that are in a wave may run the same shader in lockstep. As such, a wave may generally refer to a smallest unit of scheduled work for a compute unit (CU) (e.g., a Graphics Core Next (GCN) CU) to run (e.g., where each wave may include, for example, 64 threads).

In some cases, a GPU may terminate (e.g., suspend, kill, etc.) a wave, however processing resources (e.g., a wave slot associated with the terminated wave) may remain idle in order to wait for local memory operations to complete. For example, a next wave may not start until older waves complete as to not disrupt output ordering from GPU local memory to downstream blocks (e.g., such as a rendering backend performing post color processing on wave output), such that a wave slot associated with a terminated wave may remain idle (e.g., which may be inefficient in terms of wave slot resource utilization). The techniques described herein may provide for out of order wave slot release for a terminated wave, while maintaining output order (e.g., to a rendering backend).

A method of image processing at a device is described. The method may include determining, based on a test operation, to terminate a first wave associated with a first slot of a set of slots, updating a terminated wave bit associated with the first slot based on the determination to terminate the first wave, and updating a number of invocations field associated with the first wave based on the determination to terminate the first wave. The method may further include releasing the first slot based on updating the terminated wave bit and the number of invocations field, and outputting the number of invocations field to a rendering backend of the device based on the terminated wave bit.

An apparatus for image processing at a device is described. The apparatus may include a processor, memory coupled with the processor, and instructions stored in the memory. The instructions may be executable by the processor to cause the apparatus to determine, based on a test operation, to terminate a first wave associated with a first slot of a set of slots, update a terminated wave bit associated with the first slot based on the determination to terminate the first wave, and update a number of invocations field associated with the first wave based on the determination to terminate the first wave. The instructions may be executable by the processor to further cause the apparatus to release the first slot based on updating the terminated wave bit and the number of invocations field, and output the number of invocations field to a rendering backend of the device based on the terminated wave bit.

Another apparatus for image processing at a device is described. The apparatus may include means for determining, based on a test operation, to terminate a first wave associated with a first slot of a set of slots, updating a terminated wave bit associated with the first slot based on the determination to terminate the first wave, and updating a number of invocations field associated with the first wave based on the determination to terminate the first wave. The apparatus may further include means for releasing the first slot based on updating the terminated wave bit and the number of invocations field, and outputting the number of invocations field to a rendering backend of the device based on the terminated wave bit.

A non-transitory computer-readable medium storing code for image processing at a device is described. The code may include instructions executable by a processor to determine, based on a test operation, to terminate a first wave associated with a first slot of a set of slots, update a terminated wave bit associated with the first slot based on the determination to terminate the first wave, and update a number of invocations field associated with the first wave based on the determination to terminate the first wave. The code may include instructions further executable by a processor to release the first slot based on updating the terminated wave bit and the number of invocations field, and output the number of invocations field to a rendering backend of the device based on the terminated wave bit.

Some examples of the method, apparatuses, and non-transitory computer-readable medium described herein may further include operations, features, means, or instructions for performing the test operation for the first wave, identifying a number of pixels associated with the first wave based on the test operation, and determining, based on the test operation, to terminate all pixels of the identified number of pixels, where the determination to terminate the first wave may be based on the determination to terminate all pixels of the identified number of pixels. In some examples of the method, apparatuses, and non-transitory computer-readable medium described herein, updating the number of invocations field associated with the first wave may include operations, features, means, or instructions for updating the number of invocations field associated with the first wave to indicate the identified number of pixels.

Some examples of the method, apparatuses, and non-transitory computer-readable medium described herein may further include operations, features, means, or instructions for identifying a wave order associated with a set of waves based on a sequence queue, where the set of waves includes at least the first wave, and identifying the terminated wave bit based on the identified wave order, where the number of invocations field may be output based on the identified terminated wave bit and the identified wave order.

In some examples of the method, apparatuses, and non-transitory computer-readable medium described herein, updating the terminated wave bit and the number of invocations field may include operations, features, means, or instructions for writing the terminated wave bit and the number of invocations field to an entry of a sequence queue corresponding to the first wave. Some examples of the method, apparatuses, and non-transitory computer-readable medium described herein may further include operations, features, means, or instructions for identifying the terminated wave bit based on the sequence queue, where the number of invocations field may be output based on the identified terminated wave bit and the identified wave order.

Some examples of the method, apparatuses, and non-transitory computer-readable medium described herein may further include operations, features, means, or instructions for receiving, at the rendering backend, the output number of invocations field, and identifying a pixel ordering for rendering based on the received number of invocations field.

Some examples of the method, apparatuses, and non-transitory computer-readable medium described herein may further include operations, features, means, or instructions for processing one or more pixels of a second wave using a second slot, processing one or more pixels of a third wave using the released first slot, and processing one or more pixels of a fourth wave using a third slot. Some examples of the method, apparatuses, and non-transitory computer-readable medium described herein may further include operations, features, means, or instructions for writing the terminated wave bit and the number of invocations field to a first entry of a sequence queue corresponding to the first wave, writing the one or more pixels of the second wave to a second entry of the sequence queue corresponding to the second wave, writing the one or more pixels of the third wave to a third entry of the sequence queue corresponding to the third wave, and writing the one or more pixels of the fourth wave to a fourth entry of the sequence queue corresponding to the fourth wave.

Some examples of the method, apparatuses, and non-transitory computer-readable medium described herein may further include operations, features, means, or instructions for outputting, by a streaming processor of the device, the first entry, the second entry, the third entry, and the fourth entry to the rendering backend of the device based on the sequence queue, and identifying a pixel ordering for rendering pixel information based on the number of invocations field associated with the first wave. Some examples of the method, apparatuses, and non-transitory computer-readable medium described herein may further include operations, features, means, or instructions for performing a second test operation for the second wave, and identifying a number of pixels associated with the second wave based on the second test operation, where the one or more pixels include a subset of the number of pixels associated with the second wave.

Some examples of the method, apparatuses, and non-transitory computer-readable medium described herein may further include operations, features, means, or instructions for outputting color information associated with the one or more pixels to the rendering backend of the device based on processing the one or more pixels of the second wave.

BRIEF DESCRIPTION OF THE DRAWINGS

FIGS. 4A and 4B illustrate example processing diagrams that support out of order wave slot release for a terminated wave in accordance with aspects of the present disclosure.

DETAILED DESCRIPTION

Figure 1:
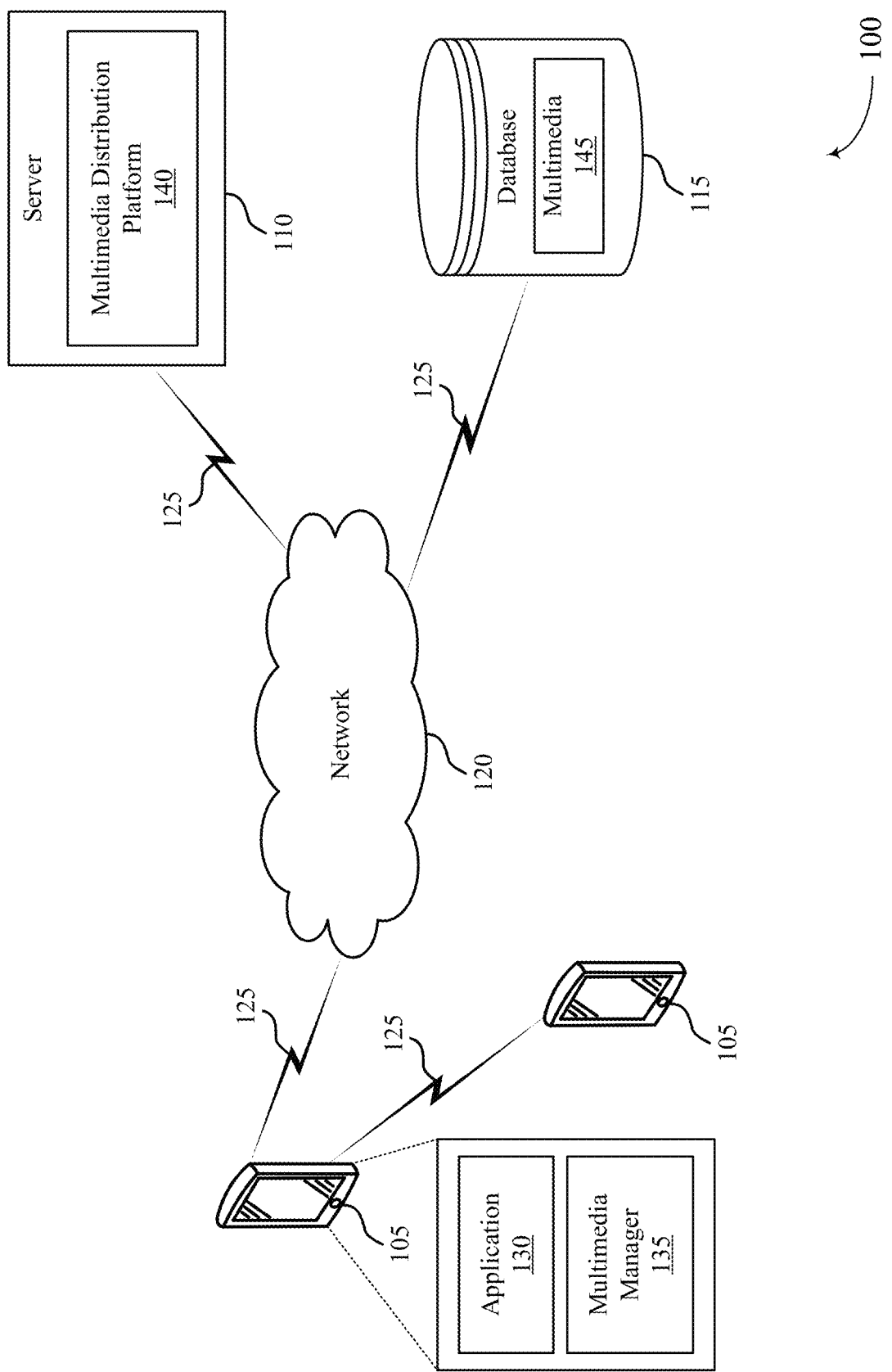
FIG. 1 illustrates an example of a system for image processing that supports out of order wave slot release for a terminated wave in accordance with aspects of the present disclosure.

A graphics processing unit (GPU) may represent one or more dedicated processors for performing graphical operations. A GPU may be a dedicated hardware unit having fixed function and programmable components for rendering graphics and executing GPU applications. In some cases, a GPU may implement a parallel processing structure that may provide for more efficient processing of complex graphic-related operations. For example, a GPU may include a plurality of processing elements that are configured to operate in a parallel manner, which may allow the GPU to generate graphic images for display (e.g., for graphical user interfaces, for display of two-dimensional or three-dimensional graphics scenes, etc.).

In some cases, a GPU may execute a shader (e.g., a shader program, a graphics program, a computer program, etc.) to perform various specialized functions in various fields of computer graphics. For example, shaders may be used widely in cinema postprocessing, computer-generated imagery, multimedia display, video games, etc. (e.g., to produce a wide range of effects such as production of appropriate levels of light, darkness, and color within an image, such as alteration of hue, saturation, brightness or contrast of an image, such as production of blur, light bloom, volumetric lighting, normal mapping for depth effects, distortion, such as edge detection, motion detection, and many others). A GPU may thus execute a shader to transform two-dimensional or three-dimensional data into useful two-dimensional data for displaying.

Shaders may be written to apply transformations to a large set of elements at a time (e.g., to each pixel in an area of a screen, or for every vertex of a model). GPUs may thus execute shaders via parallel processing, and a GPU may have multiple shader pipelines (e.g., slots, threads, etc.) to facilitate such parallel processing and improve computation throughput. Efficient compute operations may often rely on getting waves synchronized in a desired pattern (e.g., in a desired slot pattern). GPUs may implement systems of wave scheduling, however in some cases such scheduling may interfere with or contradict execution for some types of workloads. In some cases, GPUs may manage or process non-uniform and irregular workloads for graphics such that in implementation synchronization patterns may be less than ideal (e.g., some waves may wait for other waves to catch up or finish processing, which may result in processing delays, rendering latency, etc.).

For example, in some cases, streaming processors (SPs) may process input waves (e.g., pixel warps, workloads, work items, etc.) via multiple parallel wave slots according to an input order (priority order) associated with the waves. As the waves are processed, the SP may dispatch (e.g., output) results to a rendering backend (RB) in the order the waves are input to the parallel wave slots. However, processing inefficiencies may arise when a wave being processed in a wave slot is terminated (e.g., killed). For example, when a wave (e.g., a Pixel_warp W1) being processed in an available wave slot (S1) is killed, SPs may not immediately reallocate the wave slot (S1) for another wave to be processed. Instead, the wave slot may remain occupied (e.g., even though the wave is terminated such that the slot may be idle) until all higher priority waves (Pixel_warp W0) have been processed according to the input (priority) order (e.g., in order to preserve output or dispatch order to a rendering backend).

According to the techniques described herein, an event queue (e.g., a sequence queue) of a SP may include a terminated wave bit (e.g., for indicating whether a wave has been terminated) and a number of invocations field (e.g., a quad count number, a pixel count number, a fragments number, etc. for indicating the number of killed invocations, pixels, quads, etc.). When a wave is terminated, the SP may update the terminated wave bit and the number of invocations field, and the SP may release the wave slot for incoming workloads (e.g., other waves to be processed). Based on the updated terminated wave bit, a dispatcher may output the number of killed invocations to the RB. Accordingly, the SP may output processed waves (e.g., pixel information, color information, etc. associated with the processed waves) to the RB without transferring color information of killed pixels (e.g., of killed waves) while maintaining output order to the RB.

For example, a device (e.g., a GPU) may run or perform a test operation (e.g., a visibility pass, lighting test, shadow test, etc.) to determine whether or not to terminate (kill) one or more pixels of a wave (e.g., to determine whether one or more pixels of a wave will be visible after rendering). In some cases, after performing such a test, the device may determine to terminate all pixels of the wave and thus terminate the wave. Some workloads (e.g., waves) may be processed by a SP dynamically, such that the oldest workloads may be associated with higher priority to be processed and output as soon as possible. Therefore, because some devices (e.g., some GPUs) may use internal memory for storing pixel locations information, color information, etc., such information stored in internal memory may be dispatched downstream (e.g., to a RB) in order for post color processing (e.g., as the downstream block to assume the dispatched or output pixel information is in order based on workload/wave priority). In some aspects, the test operation may be included in a shader (e.g., a shader instruction). For example, the device (e.g., the GPU) may process one or more shaders (e.g., shader instructions), where the shaders may include operations (e.g., test operations) for determining whether or not to terminate (kill) one or more pixels of a wave.

According to the techniques described herein, the SP (e.g., the dispatcher) may inform a downstream block of the number of pixels killed (e.g., via a terminated wave bit and a number of invocations field) such that the downstream block may know which pixels are terminated to maintain expected ordering (e.g., for post color operations). As such, a slot associated with a terminated wave may be released to free up the slot resources for processing of a subsequent wave (e.g., rather than the slot remaining idle to preserve downstream output/dispatch ordering). The described techniques may provide for resource return and resource reuse in an efficient manner with little additional overhead, which may improve GPU performance (e.g., improve GPU resource utilization, reduce parallel slot processing interruptions, improve wave synchronization, provide greater control for non-uniform or irregular workloads, etc.).

Aspects of the disclosure are initially described in the context of a multimedia system. Aspects of the disclosure are further illustrated by and described with reference to apparatus diagrams, system diagrams, and flowcharts that relate to out of order wave slot release for a terminated wave.

FIG. 1 illustrates a multimedia system 100 for a device that supports out of order wave slot release for a terminated wave in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports out of order wave slot release for a terminated wave, such as multimedia packets, multimedia data, or multimedia control information, via network 120 using communications links 125. In some cases, a portion or all of the techniques described herein supporting out of order wave slot release for a terminated wave may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support out of order wave slot release for a terminated wave, according to the techniques described herein.

The server 110 may be a data server, a cloud server, a server associated with an multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support out of order wave slot release for a terminated wave associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The wireless communication links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The device 105 may determine, based on a test operation, to terminate a first wave associated with a first slot of a set of slots. In some aspects, the device 105 may update a terminated wave bit associated with the first slot based on the determination to terminate the first wave. In some examples, the device 105 may update a number of invocations field associated with the first wave based on the determination to terminate the first wave. The device 105 may release the first slot based on updating the terminated wave bit and the number of invocations field. In an example, the device 105 may output the number of invocations field to a rendering backend of the device based on the terminated wave bit.

The techniques described herein may provide improvements in identifying wave slots associated with terminated (e.g., killed) waves, as well as improvements in resource (e.g., slot) utilization (e.g., via improved wave slot release for incoming waves, workloads, etc.). Furthermore, the techniques described herein may provide enhancements to the operation of devices 105. For example, by releasing a slot associated with a terminated wave to free up the slot resources for processing of a subsequent wave (e.g., rather than the slot remaining idle to preserve downstream output/dispatch ordering), the operational characteristics, such as power consumption, processor utilization (e.g., DSP, CPU, GPU, ISP processing utilization), and memory usage of the devices 105 may be reduced. The techniques described herein may also provide improved efficiency associated with resource return and resource reuse of the devices 105 (e.g., resource return and resource reuse associated with wave slots of a streaming processor), with little additional overhead, by reducing latency associated with processes related to out of order wave slot release for a terminated wave.

Figure 2:
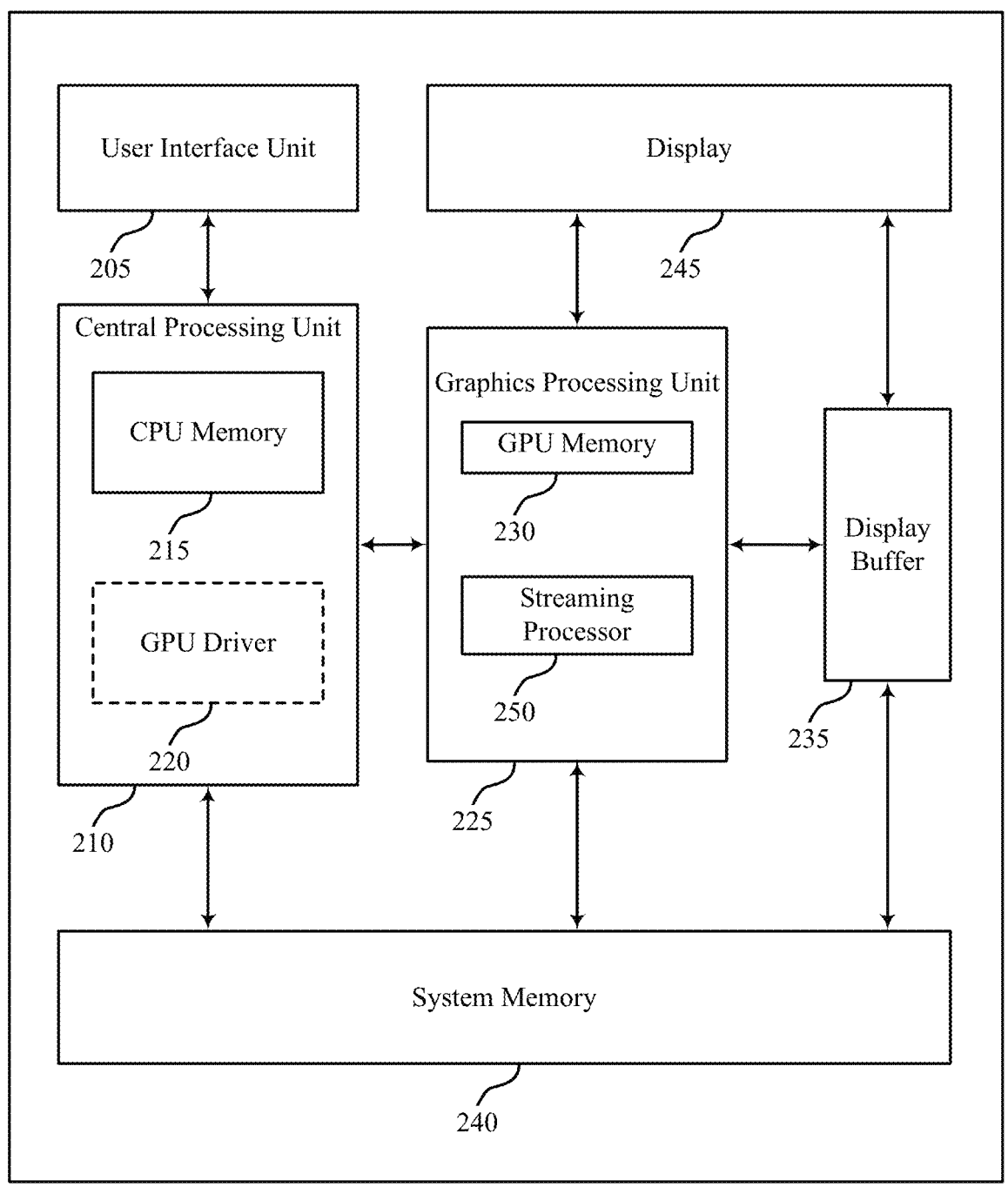
FIG. 2 illustrates an example of a device that supports out of order wave slot release for a terminated wave in accordance with aspects of the present disclosure.

FIG. 2 illustrates an example of a device 200 in accordance with various aspects of the present disclosure. In some cases, device 200 may implement aspects of out of order wave slot release for a terminated wave performed by a device 105 as described with reference to FIG. 1. Examples of device 200 include, but are not limited to, wireless devices, mobile or cellular telephones, including smartphones, personal digital assistants (PDAs), video gaming consoles that include video displays, mobile video gaming devices, mobile video conferencing units, laptop computers, desktop computers, televisions set-top boxes, tablet computing devices, e-book readers, fixed or mobile media players, and the like.

In the example of FIG. 2, device 200 includes a central processing unit (CPU) 210 having CPU memory 215, a GPU 225 having GPU memory 230 and an SP 250, a display 245, a display buffer 235 storing data associated with rendering, a user interface unit 205, and a system memory 240. For example, system memory 240 may store a GPU driver 220 (illustrated as being contained within CPU 210 as described herein) having a compiler, a GPU program, a locally-compiled GPU program, and the like. User interface unit 205, CPU 210, GPU 225, system memory 240, and display 245 may communicate with each other (e.g., using a system bus).

Examples of CPU 210 include, but are not limited to, a digital signal processor (DSP), general purpose microprocessor, ASIC, FPGA, or other equivalent integrated or discrete logic circuitry. Although CPU 210 and GPU 225 are illustrated as separate units in the example of FIG. 2, in some examples, CPU 210 and GPU 225 may be integrated into a single unit. CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via display 245. As illustrated, CPU 210 may include CPU memory 215. For example, CPU memory 215 may represent on-chip storage or memory used in executing machine or object code. CPU memory 215 may include one or more volatile or non-volatile memories or storage devices, such as flash memory, a magnetic data media, an optical storage media, etc. CPU 210 may be able to read values from or write values to CPU memory 215 more quickly than reading values from or writing values to system memory 240, which may be accessed, e.g., over a system bus.

GPU 225 may represent one or more dedicated processors for performing graphical operations. That is, for example, GPU 225 may be a dedicated hardware unit having fixed function and programmable components for rendering graphics and executing GPU applications. GPU 225 may also include a DSP, a general purpose microprocessor, an ASIC, an FPGA, or other equivalent integrated or discrete logic circuitry. GPU 225 may be built with a highly-parallel structure that provides more efficient processing of complex graphic-related operations than CPU 210. For example, GPU 225 may include a plurality of processing elements that are configured to operate on multiple vertices or pixels in a parallel manner. The highly parallel nature of GPU 225 may allow GPU 225 to generate graphic images (e.g., graphical user interfaces and two-dimensional or three-dimensional graphics scenes) for display 245 more quickly than CPU 210.

GPU 225 may, in some instances, be integrated into a motherboard of device 200. In other instances, GPU 225 may be present on a graphics card that is installed in a port in the motherboard of device 200 or may be otherwise incorporated within a peripheral device configured to interoperate with device 200. As illustrated, GPU 225 may include GPU memory 230. For example, GPU memory 230 may represent on-chip storage or memory used in executing machine or object code. GPU memory 230 may include one or more volatile or non-volatile memories or storage devices, such as flash memory, a magnetic data media, an optical storage media, etc. GPU 225 may be able to read values from or write values to GPU memory 230 more quickly than reading values from or writing values to system memory 240, which may be accessed, e.g., over a system bus. That is, GPU 225 may read data from and write data to GPU memory 230 without using the system bus to access off-chip memory. This operation may allow GPU 225 to operate in a more efficient manner by reducing the need for GPU 225 to read and write data via the system bus, which may experience heavy bus traffic.

As discussed, GPU 225 may represent one or more dedicated processors for performing graphical operations. GPU 225 may be a dedicated hardware unit having fixed function and programmable components for rendering graphics and executing GPU applications. In some cases, GPU 225 may implement a parallel processing structure that may provide for more efficient processing of complex graphic-related operations. For example, GPU 225 may include a plurality of processing elements (e.g., which in some cases may refer to slots, etc.) that may be configured to operate in a parallel manner, which may allow the GPU 225 to generate graphic images for display (e.g., for graphical user interfaces, for display of two-dimensional or three-dimensional graphics scenes, etc.).

As illustrated, GPU 225 may include SP 250. SP 250 may be configured to process workloads associated with one or more operations. Each workload, for example, may include multiple threads, and multiple threads may be grouped, for example, based on code (e.g., instructions) associated with the threads. In some aspects, SP 250 may execute the multiple threads or multiple threadgroups in parallel. SP 250 may be configured to dynamically process the workloads. In some examples, SP 250 may prioritize processing of the workloads (e.g., prioritize data associated with the workloads) so as to improve resource utilization within the SP 250. In some examples, SP 250 may determine to terminate a wave associated with a slot, and may release the slot (e.g., while maintaining output order to a RB of the device 200) according to the techniques described herein (e.g., according to implementation of a terminated wave bit and a number of invocations field via a sequence queue, etc.).

Display 245 represents a unit capable of displaying video, images, text or any other type of data for consumption by a viewer. Display 245 may include a liquid-crystal display (LCD), a light emitting diode (LED) display, an organic LED (OLED), an active-matrix OLED (AMOLED), or the like. Display buffer 235 represents a memory or storage device dedicated to storing data for presentation of imagery, such as computer-generated graphics, still images, video frames, or the like for display 245. Display buffer 235 may represent a two-dimensional buffer that includes a plurality of storage locations. The number of storage locations within display buffer 235 may, in some cases, generally correspond to the number of pixels to be displayed on display 245. For example, if display 245 is configured to include 640×480 pixels, display buffer 235 may include 640×480 storage locations storing pixel color and intensity information, such as red, green, and blue pixel values, or other color values. Display buffer 235 may store the final pixel values for each of the pixels processed by GPU 225. Display 245 may retrieve the final pixel values from display buffer 235 and display the final image based on the pixel values stored in display buffer 235.

User interface unit 205 represents a unit with which a user may interact with or otherwise interface to communicate with other units of device 200, such as CPU 210. Examples of user interface unit 205 include, but are not limited to, a trackball, a mouse, a keyboard, and other types of input devices. User interface unit 205 may also be, or include, a touch screen and the touch screen may be incorporated as part of display 245.

System memory 240 may comprise one or more computer-readable storage media. Examples of system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 240 may store program modules and/or instructions that are accessible for execution by CPU 210. Additionally, system memory 240 may store user applications and application surface data associated with the applications. System memory 240 may in some cases store information for use by and/or information generated by other components of device 200. For example, system memory 240 may act as a device memory for GPU 225 and may store data to be operated on by GPU 225 as well as data resulting from operations performed by GPU 225

In some examples, system memory 240 may include instructions that cause CPU 210 or GPU 225 to perform the functions ascribed to CPU 210 or GPU 225 in aspects of the present disclosure. System memory 240 may, in some examples, be considered as a non-transitory storage medium. The term "non-transitory" should not be interpreted to mean that system memory 240 is non-movable. As one example, system memory 240 may be removed from device 200 and moved to another device. As another example, a system memory substantially similar to system memory 240 may be inserted into device 200. In certain examples, a non-transitory storage medium may store data that can, over time, change (e.g., in RAM).

System memory 240 may store a GPU driver 220 and compiler, a GPU program, and a locally-compiled GPU program. The GPU driver 220 may represent a computer program or executable code that provides an interface to access GPU 225. CPU 210 may execute the GPU driver 220 or portions thereof to interface with GPU 225 and, for this reason, GPU driver 220 is shown in the example of FIG. 2 within CPU 210. GPU driver 220 may be accessible to programs or other executables executed by CPU 210, including the GPU program stored in system memory 240. Thus, when one of the software applications executing on CPU 210 requires graphics processing, CPU 210 may provide graphics commands and graphics data to GPU 225 for rendering to display 245 (e.g., via GPU driver 220).

In some cases, the GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, CPU 210 may issue one or more rendering commands to GPU 225 (e.g., through GPU driver 220) to cause GPU 225 to perform some or all of the rendering of the graphics data. In some examples, the graphics data to be rendered may include a list of graphics primitives (e.g., points, lines, triangles, quadrilaterals, etc.).

The GPU program stored in system memory 240 may invoke or otherwise include one or more functions provided by GPU driver 220. CPU 210 generally executes the program in which the GPU program is embedded and, upon encountering the GPU program, passes the GPU program to GPU driver 220. CPU 210 executes GPU driver 220 in this context to process the GPU program. That is, for example, GPU driver 220 may process the GPU program by compiling the GPU program into object or machine code executable by GPU 225. This object code may be referred to as a locally-compiled GPU program. In some examples, a compiler associated with GPU driver 220 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

In the example of FIG. 2, the compiler may receive the GPU program from CPU 210 when executing HL code that includes the GPU program. That is, a software application being executed by CPU 210 may invoke GPU driver 220 (e.g., via a graphics API) to issue one or more commands to GPU 225 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to GPU 225 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), GPU driver 220 may formulate one or more commands that specify one or more operations for GPU 225 to perform in order to render the primitive. When GPU 225 receives a command from CPU 210, it may decode the command and configure one or more processing elements to perform the specified operation and may output the rendered data to display buffer 235.

GPU 225 generally receives the locally-compiled GPU program, and then, in some instances, GPU 225 renders one or more images and outputs the rendered images to display buffer 235. For example, GPU 225 may generate a number of primitives to be displayed at display 245. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. Generally, the term "primitive" refers to any basic geometric shape or element capable of being rendered by GPU 225 for display as an image (or frame in the context of video data) via display 245. GPU 225 may transform primitives and other attributes (e.g., that define a color, texture, lighting, camera configuration, or other aspect) of the primitives into a so-called "world space" by applying one or more model transforms (which may also be specified in the state data). Once transformed, GPU 225 may apply a view transform for the active camera (which again may also be specified in the state data defining the camera) to transform the coordinates of the primitives and lights into the camera or eye space. GPU 225 may also perform vertex shading to render the appearance of the primitives in view of any active lights. GPU 225 may perform vertex shading in one or more of the above model, world, or view space.

Once the primitives are shaded, GPU 225 may perform projections to project the image into a canonical view volume. After transforming the model from the eye space to the canonical view volume, GPU 225 may perform clipping to remove any primitives that do not at least partially reside within the canonical view volume. That is, GPU 225 may remove any primitives that are not within the frame of the camera. GPU 225 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, GPU 225 may then rasterize the primitives. Generally, rasterization may refer to the task of taking an image described in a vector graphics format and converting it to a raster image (e.g., a pixelated image) for output on a video display or for storage in a bitmap file format.

A GPU 225 may include a dedicated fast bin buffer (e.g., a fast memory buffer, such as global memory (GMEM), which may be referred to by GPU memory 230). As discussed herein, a rendering surface may be divided into bins. In some cases, the bin size is determined by format (e.g., pixel color and depth information) and render target resolution divided by the total amount of GMEM. The number of bins may vary based on device 200 hardware, target resolution size, and target display format. A rendering pass may draw (e.g., render, write, etc.) pixels into GMEM (e.g., with a high bandwidth that matches the capabilities of the GPU). The GPU 225 may then resolve the GMEM (e.g., burst write blended pixel values from the GMEM, as a single layer, to a display buffer 235 or a frame buffer in system memory 240). Such may be referred to as bin-based or tile-based rendering. When all bins are complete, the driver may swap buffers and start the binning process again for a next frame.

For example, GPU 225 may implement a tile-based architecture that renders an image or rendering target by breaking the image into multiple portions, referred to as tiles or bins. The bins may be sized based on the size of GPU memory 230 (e.g., which may alternatively be referred to herein as GMEM or a cache), the resolution of display 245, the color or Z precision of the render target, etc. When implementing tile-based rendering, GPU 225 may perform a binning pass and one or more rendering passes. For example, with respect to the binning pass, GPU 225 may process an entire image and sort rasterized primitives into bins.

Figure 3:
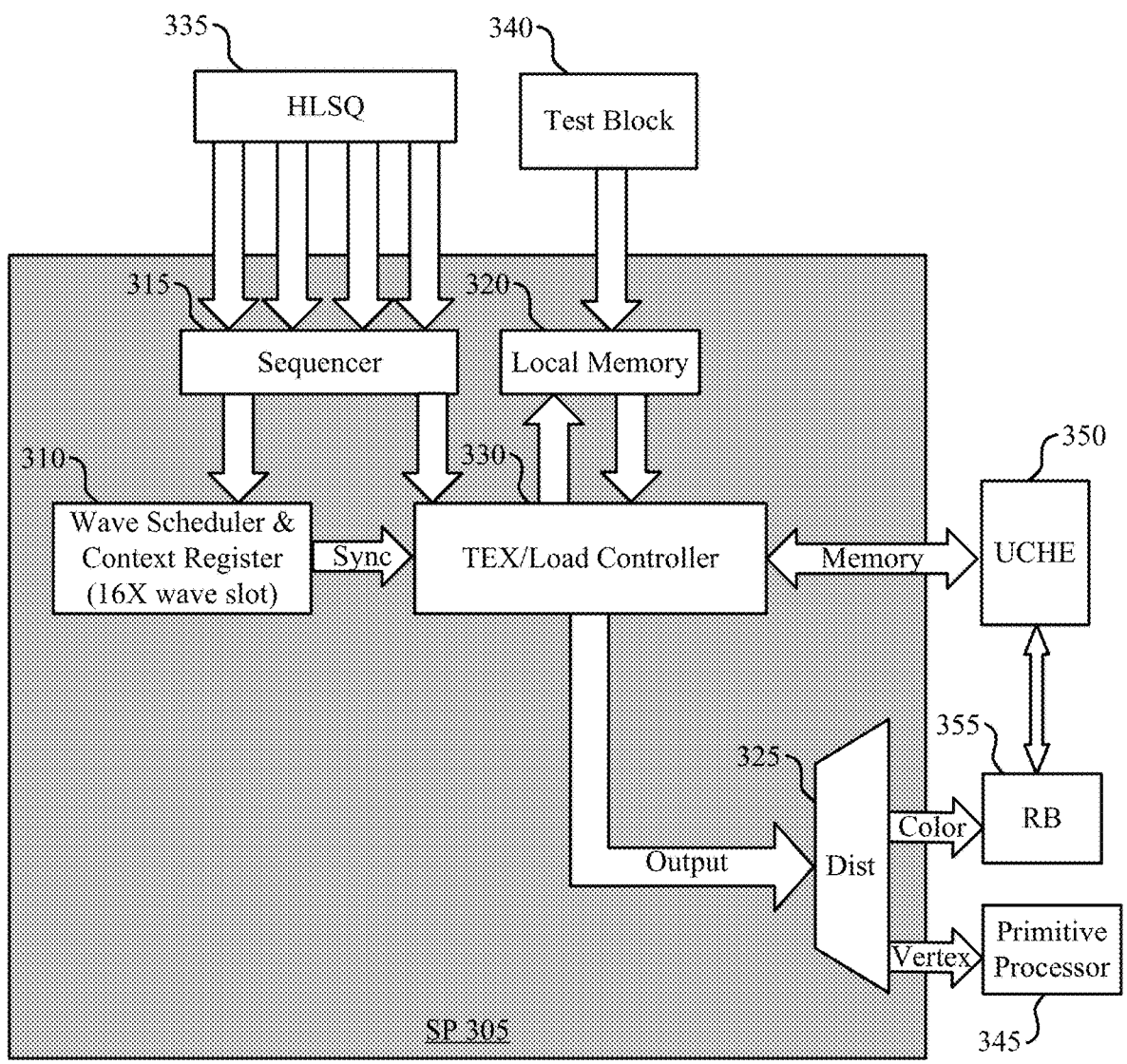
FIG. 3 illustrates an example of a processing diagram that supports out of order wave slot release for a terminated wave in accordance with aspects of the present disclosure.

FIG. 3 illustrates an example GPU 300 that supports out of order wave slot release for a terminated wave in accordance with aspects of the present disclosure. In some examples, the example GPU 300 may implement aspects of multimedia system 100. GPU 300, for example, may implement aspects of devices 105 and device 200. GPU 300 may include an SP 305, a high level sequencer (HLSQ) 335, a test block 340, UCHE 350 (e.g., unified L2 cache), rendering backend (RB) 355, and a primitive processor 345.

The SP 305 may include aspects of streaming processors as described herein. For example, SP 305 may be an example of or refer to of aspects of SP 250, streaming processor 630, and streaming processor 720, as described herein. In some aspects, SP 305 may prioritize processing of workloads (e.g., prioritize data associated with the workloads) so as to improve resource utilization within the SP 305. The SP 305 may include a sequencer 315, local memory 320, a wave scheduler 310 (e.g., a wave scheduler and context register), a TEX/load controller 330 (e.g., texel/load controller), and a distributor 325 (e.g., a dispatcher). SP 305 may include one or more physical processors located on GPU 300 configured to run or execute fragment and vertex shaders.

According to the techniques described herein, GPU 300 may support out of order resource (e.g., wave slot) release for terminated waves. For example, SP 305 may implement a terminated wave bit and a number of invocations field, such that the RB 355 may identify a terminated wave and the number of pixels associated with the terminated wave (e.g., such that slot resources associated with the terminated wave may be reallocated while maintaining ordering information at RB 355). For instance, GPU 300 may use internal memory (e.g., local memory 320) for storing pixel information (e.g., pixel location information, pixel color information, etc.). As such, SP 305 may wait (e.g., based on local memory 320 usage to reduce UCHE 350 cost) for such pixel information to be dispatched (e.g., via distributor 325) downstream (e.g., to RB 355) for post color processing. As such, a downstream block (e.g., RB 355) may interpret color information from distributor 325 according to some order.

When all pixels of a wave are terminated or killed, the described techniques may take advantage of not needing to output any data or color information for any of the pixels of the terminated wave (e.g., such that the wave slot associated with the terminated wave may be released quickly and made available for subsequent waves). The wave slot may be released, and SP 305 (e.g., via sequencer 315, distributor 325, etc.) may generate, sequence and output a terminated wave bit and a number of invocations field, such that the RB 355 may identify a wave was killed (e.g., based on the terminated wave bit) and how many pixels or quads are associated with the killed wave (e.g., based on the number of invocations field). Further, the RB 355 may thus maintain pixel ordering (e.g., ordering of color information output from distributor 325) without requiring additional tracking logic. As such, reduced output (e.g., reduced overhead) associated with the described techniques (e.g., due to no downstream pixel information associated with cases where all pixels are terminated of a terminated wave) may provide for resource release (e.g., wave slot release) in an efficient manner.

In some cases, in addition to graphics operations (e.g., such as triangle rasterization to generate pixel information, pixel processing discussed herein, etc.), SP 305 may further perform compute operations. For example, compute operations may form work item based execution for computations. In some cases, compute operations may not be associated with an ordering requirement (e.g., an eldest scheme) as outputs may go to system memory. Generally, the techniques described herein may additionally apply to compute operations (e.g., slots may be released for next workloads), as well as other operations, by analogy, without departing from the scope of the present disclosure. Test block 340 may generally perform early rejection of objects of any kind (e.g., objects, draw calls, tiles, triangles, pixels, etc.) that don't contribute to the final image.

In some aspects, test block 340 may perform early rejection of objects via one or more test operations, culling operations, rasterization operations, etc. which may reject, for example, triangles, different tiles, etc. In some aspects, test block 340 may perform early rejection of objects, for example, during rasterization (e.g., tiles may be dropped, primitives that are below a display size threshold may be rejected). For example, test block 340 may perform a test operation (e.g., a visibility pass, a culling operation, etc.), may determine to terminate invocations (e.g., pixels, quads, etc.) of a wave, may determine to terminate a wave, etc. In some cases, test block 340 may exchange (e.g., pass) information (e.g., pixel coefficient information, culling information, termination information, etc.) to local memory 320, to distributor 325, etc. In some cases, some or all aspects of test block 340 may refer to or be implemented by SP 305. TEX/load controller 330 may store and load information (e.g., such as pixel coefficient information) from local memory 320.

In some aspects, SP 305 may include one or more streaming processors configured to process input waves (e.g., pixel warps, workloads, work items, etc.) via multiple parallel wave slots. SP 305 may be configured to process the input waves according to an input order (priority order) associated with the waves. As the waves are processed, the SP 305 (e.g., via distributor 325) may dispatch (e.g., output) results to a RB 355 based on a wave order in which the waves are input to the parallel wave slots. For example, workloads (e.g., waves) may be processed in SP 305 dynamically. In some cases, the oldest workloads may have priority such that the oldest workloads may be processed as soon as possible, via available slot resources, such that the oldest workloads may be output to the RB 355 as soon as possible. In some cases, RB 355 may access or utilize memory via UCHE 350.

In some cases, sequencer 315 of SP 305 may send information (e.g., thread information) to wave scheduler 310, may send information (e.g., attribute information) to TEX/Load controller 330, etc. In some aspects, sequencer 315 may allocate wave slots and associated graphics processing space based on pixel tile workload (e.g., i/j barycentric coefficient data) issued to SP 305, for example, by HLSQ 335. For example, in some cases, sequencer 315 may receive vertex thread (Vtx thread) information, vertex attribute (Vtx Attribute) information, pixel thread information, pixel attribute information, etc. from HLSQ 335. In an example, sequencer 315 may then send thread information to wave scheduler 310 and attribute information to TEX/Load controller 330 (e.g., in accordance with aspects of sequencing described herein).

In some example aspects, the wave scheduler 310 of SP 305 may output an indication of terminated (e.g., killed) waves. In some aspects, the wave scheduler 310 may output a terminated wave bit (e.g., a toggle bit corresponding to the terminated wave, an integer, a set of integers, etc.) indicative of the terminated wave. In some examples, the SP 305 (e.g., the wave scheduler 310) may output a number of invocations field, which may include a quad number (e.g., number of quads, number of pixels, number of fragments, etc.) associated with the terminated wave. In some examples, the SP 305 (e.g., the wave scheduler 310) may terminate waves and output the indication of the terminated waves based on a test operation (e.g., a visibility pass, lighting test, shadow test, etc.) performed by a device 105.

The wave scheduler 310 of SP 305 may manage ordering (e.g., reordering) associated with processing pixel shaders (e.g., the wave scheduler 310 may manage wave scheduling), based on wave kill commands issued by the device 105 (e.g., terminate wave or kill wave commands issued by the GPU 300) with respect to a test operation. For example, wave scheduler 310 may execute one or more pixel shaders (e.g., schedule processing of pixel shaders and allocate or reallocate wave slots associated with processing the pixel shaders). In cases where a wave is terminated (e.g., in cases where all pixels of a wave are killed and the wave is terminated), wave scheduler 310 may reallocate resources (e.g., slots) associated with the terminated wave as described in more detail herein.

In some aspects, wave scheduler 310 may also be referred to as a thread scheduler. The wave scheduler 310 may assign one or more threads or threadgroups according to resource allocations, processes, hardware, etc. associated with the threads or threadgroups. In some aspects, wave scheduler 310 may store information indicating the assignments, for example, in one or more context registers associated with each thread.

In some aspects, wave scheduler 310 may exchange instructions associated with processing the pixel shaders (e.g., processing the waves) with TEX/load controller 330, etc. In an example, wave scheduler 310 may execute or implement processing instructions (e.g., addresses, predicate, etc.) associated with pixel shader processing (e.g., via elementary function units (EFUs), full arithmetic logic units (FALUs), half arithmetic logic units (HALUs), etc.). SP 305 may refrain from executing or processing waves which are indicated by the wave scheduler 310 as terminated (e.g., killed) waves.

According to examples of aspects of the techniques described herein, when a wave being processed in a wave slot is terminated (e.g., killed), SP 305 may improve processing efficiency through wave slot allocation (e.g., reallocation) at wave scheduler 310. For example, when a wave W1 (also referred to as a Pixel_warp W1) being processed in a wave slot S1 is terminated, SP 305 may improve processing efficiency through allocation (e.g., reallocation) of wave slot S1 by wave scheduler 310.

In some aspects, wave scheduler 310 may reallocate the wave slot for processing another wave to be processed (e.g., wave scheduler 310 may reallocate the wave slot S1 for processing a wave W4 to be processed). In an example, among a set of waves W1 through W4 to be processed, wave W4 may have a lower priority compared to waves W0, W2, and W3. In an example aspect, wave scheduler 310 may reallocate the wave slot W1 for processing W4, such that wave W4 may be processed at wave slot W1 prior to the completed execution of waves W0, W2, and W3, which (e.g., according to the input order) have a higher priority than wave W4. For example, SP 305 may process wave W4 without waiting until processing of waves W0, W2, or W3 is complete. Based on the reallocation, idle time of wave slots associated with a killed wave may be reduced or eliminated (e.g., idle time of the wave slot S1 may be reduced or eliminated).

Aspects of SP 305 may be advantageous over some SPs. For example, for some SPs, when a wave being processed in a wave slot is terminated (e.g., killed), processing by the SPs may be inefficient. For example, when a wave W1 (also referred to as a Pixel_warp W1) being processed in a wave slot S1 is terminated, some SPs may not reallocate the wave slot S1 for processing another wave to be processed (e.g., some SPs may not immediately reallocate the wave slot S1 for a wave to be processed). That is, the wave slot may remain occupied until all higher priority waves (e.g., according to the input order) have been processed. For example, for a wave W4 to be processed, some SPs may wait to reallocate the wave slot S1 allocated for wave W1 until waves W0, W2, W3 having higher priority compared to the wave W4 have been processed, even when wave W1 has already been terminated (e.g., as further described herein, for example, with reference to FIG. 4A).

Based on the wave slot processing (e.g., the pixel shader processing) according to aspects described herein, for example, based on completion of the wave slot processing, SP 305 may dispatch processed results to a downstream block such as RB 355. In some aspects, the processed results may include color information. SP 305 may, for example, dispatch the processed results to the RB 355 via an output interface such as distributor 325. Distributor 325 may include a demultiplexer, and in some examples, may be referred to as a dispatcher. In some aspects, SP 305 (e.g., wave scheduler 310) may direct TEX/load controller 330 to read-out buffered results (e.g., from a general purpose register (GPR)) to the distributor 325.

The distributor 325 (e.g., which in some cases may be referred to as a dispatcher) may output pixels associated with waves (e.g., output pixels associated with non-killed waves) to RB 355. For example, the distributor 325 may output color information of pixels associated with non-killed waves to RB 355. In some aspects, the distributor 325 may refrain from outputting pixels (e.g., color information of pixels) associated with killed waves to RB 355. In some example aspects, for a terminated (e.g., killed) wave, the distributor 325 may output the terminated wave bit, the number of invocations field (e.g., quads) associated with the terminated wave, or a combination thereof to RB 355.

In some aspects, the distributor 325 may output vertex specifications to primitive processor 345. The vertex specifications may be included in, for example, LL instructions (primitive definitions) as described herein. For example, the vertex specifications may specify one or more vertices associated with primitives to be rendered.

In some aspects of the techniques described, SP 305 may manage ordering associated with processing a set of waves, which may reduce overhead at the rendering backend (e.g., may reduce overhead at the RB 355). For example, SP 305 may manage ordering of waves (e.g., SP 305 may manage allocation and reallocation of wave slots for processing waves, based on terminated waves) at the wave scheduler 310, and SP 305 may output processed results associated with the waves (e.g., SP 305 may output pixels for non-terminated waves, SP 305 may output a number of invocations field for terminated waves, etc.) to the RB 355 via the distributor 325.

In some cases, GPU 300 (e.g., RB 355) may process the waves (e.g., manage rendering associated with the waves, process pixels of the waves) based on the order in which the waves are output to the RB 355 by the distributor 325. In an example aspect, processing pixels of Wave W4 may include performing one or more rendering passes for rendering pixels of Wave W4. In some aspects, GPU 300 (e.g., RB 355) may process the waves based on terminated wave bits and the number of invocations field received from the SP 305 (e.g., as received from the distributor 325). For example, based on a terminated wave bit and the number of invocations field, the RB 355 may identify a terminated wave and the number of pixels associated with the terminated wave (e.g., such that slot resources associated with the terminated wave may be reallocated while maintaining ordering information at RB 355).

FIG. 4A illustrates an example of a processing diagram 400 illustrating some aspects of out of order wave slot release for a terminated wave, in accordance with aspects of the present disclosure. In some examples, processing diagram 400 may implement aspects of multimedia system 100. Processing diagram 400 may implement aspects of devices 105, device 200, and GPU 300 described herein. Processing diagram 400 includes a sequence queue 405, wave slots 415, and an execution timeline 420. Some example aspects of processing diagram 400 are also described in reference to FIG. 3.

Sequence queue 405 may include a read pointer (RPTR) 406, a write pointer (WPTR) 407, and entries 410 (e.g., queue assignments). RPTR 406 may include a pointer associated with reading data (e.g., wave information, assigned slot) from the sequence queue 405. WPTR 407 may include a pointer associated with writing data to the sequence queue 405. Sequence queue 405, for example, may include a lookup table, a location in local memory, etc., and RPTR 406 and WPTR 407 may include pointers associated with reading data from the sequence queue 405 and writing data to the sequence queue 405.

In some aspects, sequence queue 405 may be determined or modified by a GPU (e.g., GPU 225, GPU 300) as described herein. For example, sequence queue 405 may be determined or modified by an SP (e.g., SP 305) as described herein. For example, a wave scheduler (e.g., wave scheduler 310) as described herein may determine or modify sequence queue 405.

Entries 410 may each indicate a wave scheduled for processing (e.g., as scheduled by wave scheduler 310 of SP 305), a slot allocated for processing the wave, or a combination thereof. In the example illustrated in processing diagram 400, entries 410 indicated in the sequence queue 405 may be associated with waves (e.g., waves W0 through W6, which may also be referred to as Pixel_warp W0 through Pixel_warp W6) scheduled to be processed and slots (e.g., slots S0 through S3) which may be allocated for processing the waves. For example, entry 410-a (e.g., W0/S0) may be associated with wave W0 and a slot S0 allocated for processing the wave W0, entry 410-b (e.g., W1/S1) may be associated with a wave W1 and a slot S1 allocated for processing the wave W1, entry 410-c (e.g., W2/S2) may be associated with a wave W2 and a slot S2 allocated for processing the wave W2, etc.

Slots 415 may correspond to wave slots which may be allocated by SP 305 for processing input waves. For example, as illustrated in the example of FIG. 4A, slot 415-a may correspond to slot S0, slot 415-*b* may correspond to slot S1, slot 415-*c* may correspond to slot S2, and slot 415-*d* may correspond to slot S3.

Execution timeline 420 is an example timeline illustrating aspects of processing waves W0 through W6 by GPU 300 (e.g., SP 305). Timelines 425-*a* through 425-*g* correspond to timelines associated with processing waves W0 through W6. For example, timeline 425-*a* may be associated with processing wave W0 (Pixel_warp W0), timeline 425-*b* may be associated with processing wave W1 (Pixel_warp W1), timeline 425-*c* may be associated with processing wave W2 (Pixel_warp W2), etc.

In the example illustrated in FIG. 4A, waves W1 through W3 have a highest priority (e.g., according to input order) among waves W0 through W6 to be processed. Waves W1 through W3 are processed at slots 415-*a* through 415-*d* (e.g., slots S0 through S3), respectively. Waves W4 through W6 are processed at slots 415-*a* through 415-*c* (e.g., slots S0 through S2), respectively. In other words, processing diagram 400 may illustrate a wave priority corresponding to an eldest scheme (e.g., where older waves have priority over newer waves).

In the example, a next wave (e.g., wave W4 having the next highest priority following waves W0 through W3) is allocated slot 415-*a* (e.g., slot S0) for processing, after processing of wave W0 (e.g., illustrated by timeline 425-*a*), which has the highest priority, is completed.

Wave W1 (Pixel_warp W1) being processed in slot 415-*a* (e.g., wave slot S1) is terminated (as illustrated by timeline 425-*b*) prior to processing completion of wave W0. However, slot 415-*a* is not reallocated for processing another wave to be processed, until after a wait period 430. That is, GPU 300 waits to allocate a next wave (e.g., wave W5 having the next highest priority following waves W0 through W4) to slot 415-*b* (e.g., slot S1) for processing until after the wait period 430 has expired. Specifically, the slot 415-*b* may be held idle until older waves have been executed (e.g., until wave W0 has been executed, completed, etc.). For example, in order to output color information associated with waves W0 through W6, without the techniques described herein, slot 415-*b*, upon termination of wave W1, may remain idle. Accordingly, slot 415-*b* (e.g., slot S1) may incur an idle time corresponding to the wait period 430. As illustrated in FIG. 4A, without out of order wave slot release for a terminated wave, an early executing wave (e.g., a wave having relatively high priority among waves to be processed) may be the last to be processed completely among waves to be processed, which may result in low resource utilization of an SP (e.g., low resource utilization of SP 305).

FIG. 4B illustrates an example of a processing diagram 401 that supports out of order wave slot release for a terminated wave in accordance with aspects of the present disclosure. In some examples, processing diagram 401 may implement aspects of multimedia system 100. Processing diagram 401 may implement aspects of devices 105, device 200, and GPU 300 described herein. Example aspects of processing diagram 401 are described in reference to FIG. 3.

Processing diagram 401 illustrates an example of a sequence queue 435, wave slots 445, and an execution timeline 450. Example aspects of processing diagram 401 are described in reference to FIG. 3. Sequence queue 435 may include a RPTR 436, a WPTR 407, and entries 440. Aspects of sequence queue 435, RPTR 436, WPTR 407, entries 440, slots 445, execution timeline 450, and timelines 455 may include aspects similar to those described with respect to sequence queue 405, RPTR 406, WPTR 407, entries 410, slots 415, execution timeline 420, and timelines 425, but may differ where indicated in relation to aspects as described herein.

In some example aspects, sequence queue 435 may be determined or modified by a device 105, for example, a GPU (e.g., GPU 225, GPU 300) as described herein. For example, a wave scheduler (e.g., wave scheduler 310) as described herein may modify sequence queue 435 based on a terminated wave (e.g., based on termination of a wave W1 allocated a slot S1). For example, in some cases, wave scheduler 310 may add or toggle a terminated wave bit to sequence queue 435, may update sequence queue 435 based on out of order wave slot release, etc.

Referring to the example of FIG. 4B, the device 105 (e.g., GPU 300) may perform a test operation for a wave W1 (e.g., a first wave). The test operation may include, for example, a visibility pass associated with primitives that visible in an image and primitives that are invisible in the same image. In some aspects, GPU 300 may identify a number of pixels associated with the wave W1 based on the test operation. Based on the test operation, GPU 300 may determine to terminate all pixels of the identified number of pixels (e.g., the test operation may result in GPU 300 determination that all pixels associated with the wave are invisible, can be terminated, etc.). As such, in addition to setting the wave terminated bit, the number of pixels may be indicated, for example, by a quad count number (e.g., a number of invocations field) associated with the wave W1. In some example aspects, GPU 300 may perform multiple test operations.

In some example aspects, the device 105 (e.g., GPU 300) may determine, based on the test operation, to terminate wave W1. Wave W1 may be associated with a slot S1 (e.g., slot 445-*b*). In some aspects, the determination to terminate wave W1 may be based on the determination to terminate all pixels of the identified number of pixels.

The device 105 (e.g., a SP 305 of GPU 300) may identify a wave order associated with a set of waves including wave W1 based on sequence queue 435. For example, various aspects or components of GPU 300 (e.g., a SP, a distributor, a dispatcher, a RB) may identify a wave order associated with waves W1 through W6 based on sequence queue 435. In some aspects, GPU 300 components may identify the terminated wave bit based on the identified wave order of sequence queue 435. For example, in some cases, a distributor or a dispatcher of a GPU may output information based on sequence queue 435. Based on sequence queue 435, the distributor may output pixel information (e.g., color information) of W0 to a RB, may identify a killed wave bit (terminated wave bit) and output a number of invocations field to the RB, may output pixel information (e.g., color information) of W2 to the RB, etc. As such, slot 445-*b* may be released (e.g., for processing of W4 with reduced latency or idle time) while maintaining output order to a downstream block (e.g., such as a RB). The RB may thus perform post color operations efficiently, as the RB may receive information in order and identify any terminated waves/pixels such that pixel ordering may be maintained (e.g., such that pixel information or color information associated with wave W0 and wave W2 may be appropriately handled/ordered by the RB based on the number of invocations/pixels field associated with wave W1).

The device 105 (e.g., GPU 300) may update a terminated wave bit (e.g., "killed", as indicated at entry 440-*b*) associated with slot S1 based on the determination to terminate wave W1. For example, in updating the terminated wave bit, GPU 300 may write the terminated wave bit and the number of invocations field to entry 440-b of sequence queue 435 corresponding to wave W1. In some aspects, the device 105 (e.g., GPU 300) may update a number of invocations field associated with wave W1 based on the determination to terminate wave W1. The number of invocations field may include a quad count number, a pixel count number, a fragments number, etc. for indicating the number of killed invocations, pixels, quads, etc. In some examples, the device 105 (e.g., GPU 300) may update the number of invocations field associated with wave W1 to indicate the identified number of pixels associated with the wave W1 (e.g., the identified pixels to be terminated).

Generally, a SP may determine the number of invocations (e.g., pixels) associated with the terminated wave (e.g., via a test operation, etc.), and any component may store the number of invocations field (e.g., not necessarily the sequence queue 435). For example, in some cases, the sequence queue 435 may include the terminated wave bit, such that a distributor or dispatcher, upon identifying the terminated wave bit, may output the number of invocations field (e.g., instead of any color information associated with the terminated wave). In some cases, a distributor or dispatcher of the SP may gather or determine color information (e.g., for waves W0, W2, W3, etc.) and number of invocations field (e.g., for wave W1) from other components of the SP, and the distributor or dispatcher may dispatch such information to a RB based on the sequence queue 435 (e.g., based on an ordering indicated by sequence queue 435, based on any wave terminated bits of sequence queue 435, etc.).

According to example aspects of out of order wave slot release for a terminated wave (e.g., terminated wave W1) as described herein, the device 105 (e.g., GPU 300, wave scheduler 310) may release slot S1, for example, based on updating the terminated wave bit and the number of invocations field. For example, the device 105 (e.g., GPU 300, wave scheduler 310) may release slot S1 for incoming workloads (e.g., other waves to be processed).

In some aspects, the device 105 (e.g., SP 305) may process one or more pixels of wave W2 (e.g., a second wave) using slot S2 (e.g., slot 445-c). In some example aspects, GPU 300 may process one or more pixels of wave W5 (e.g., a third wave) using the released slot S1 (e.g., slot 445-b). In an example, GPU 300 may process one or more pixels of wave W4 (e.g., a fourth wave) using slot S3.

In some example aspects, the device 105 (e.g., GPU 300) may write the terminated wave bit (e.g., "killed") and the number of invocations field to a first entry 440-b of sequence queue 435, where first entry 440-b corresponds to the wave W1 (i.e., the terminated wave). The device 105 (e.g., GPU 300) may write one or more pixels of the wave W2 (e.g., the second wave) to a second entry 440-c of sequence queue 435, where second entry 440-c corresponds to wave W2. The one or more pixels may include, for example, color information as described herein.

In some aspects, the device 105 (e.g., GPU 300) may write the one or more pixels of the wave W5 (e.g., the third wave) to a third entry 440-f of sequence queue 435, where third entry 440-e corresponds to the wave W5. The device 105 (e.g., GPU 300) may write the one or more pixels of wave W4 (e.g., the fourth wave) to a fourth entry 440-e of the sequence queue 435, where fourth entry 440-e corresponds to the wave W4.

The device 105 (e.g., GPU 300) may output, by SP 305 (e.g., by distributor 325), the entries 440 to the rendering backend (e.g., RB 355) of the device based on the sequence queue 435. In some aspects, the device 105 (e.g., GPU 300, RB 355) may identify a pixel ordering for rendering pixel information based on the number of invocations field associated with the wave W1 (e.g., the first wave). In some example aspects, the device 105 (e.g., GPU 300) may output the number of invocations field to a rendering backend (e.g., RB 355) of the device 105, based on the terminated wave bit. In some aspects, the device 105 (e.g., GPU 300) may output the number of invocations field based on the identified terminated wave bit and the identified wave order. The device 105 (e.g., GPU 300) may receive, at the rendering backend (e.g., RB 355), the output number of invocations field. The device 105 (e.g., GPU 300, RB 355) may identify a pixel ordering for rendering based on the received number of invocations field.

In some example aspects, for example, the device 105 (e.g., GPU 300) may perform test operations as described herein, for waves other than wave W1 (e.g., for a wave W2). For example, the device 105 (e.g., GPU 300) may perform a test operation as described herein, for wave W2 (e.g., the second wave), and may identify a number of pixels associated with the wave W2 based on the second test operation. The device 105 (e.g., GPU 300) may process a subset of pixels associated with the wave W2, for example, where processing includes outputting color information associated with the subset of pixels to the rendering backend (e.g., RB 355) of the device.

In some aspects, there may be multiple scenarios associated with enabling a pixel kill feature for processing waves. One scenario may include a partial wave kill (e.g., some valid pixels survive). In such a scenario, techniques may include optimization to reassemble survived pixels into full waves, which may increase wave execution efficiency but at the cost of additional overhead due to "multiple pass" execution (e.g., stopping a wave execution immediately after the wave is killed, pushing surviving pixels to a survivor pool, reassembling pixels from the survivor pool). Another example scenario may include a complete wave kill (e.g., no valid pixel survives). In such a scenario, where all valid quads in the wave are killed, the techniques described herein may be applied to pass down minimal information (e.g., a number of invocations field, a terminated wave bit, etc.) to a downstream block (e.g., RB 355). For example, the techniques include providing bits associated with a pixel quad counter, which may be relatively minimal compared to data (e.g., pixel information, color information, etc.) associated with a wave as a whole.

Figure 5:
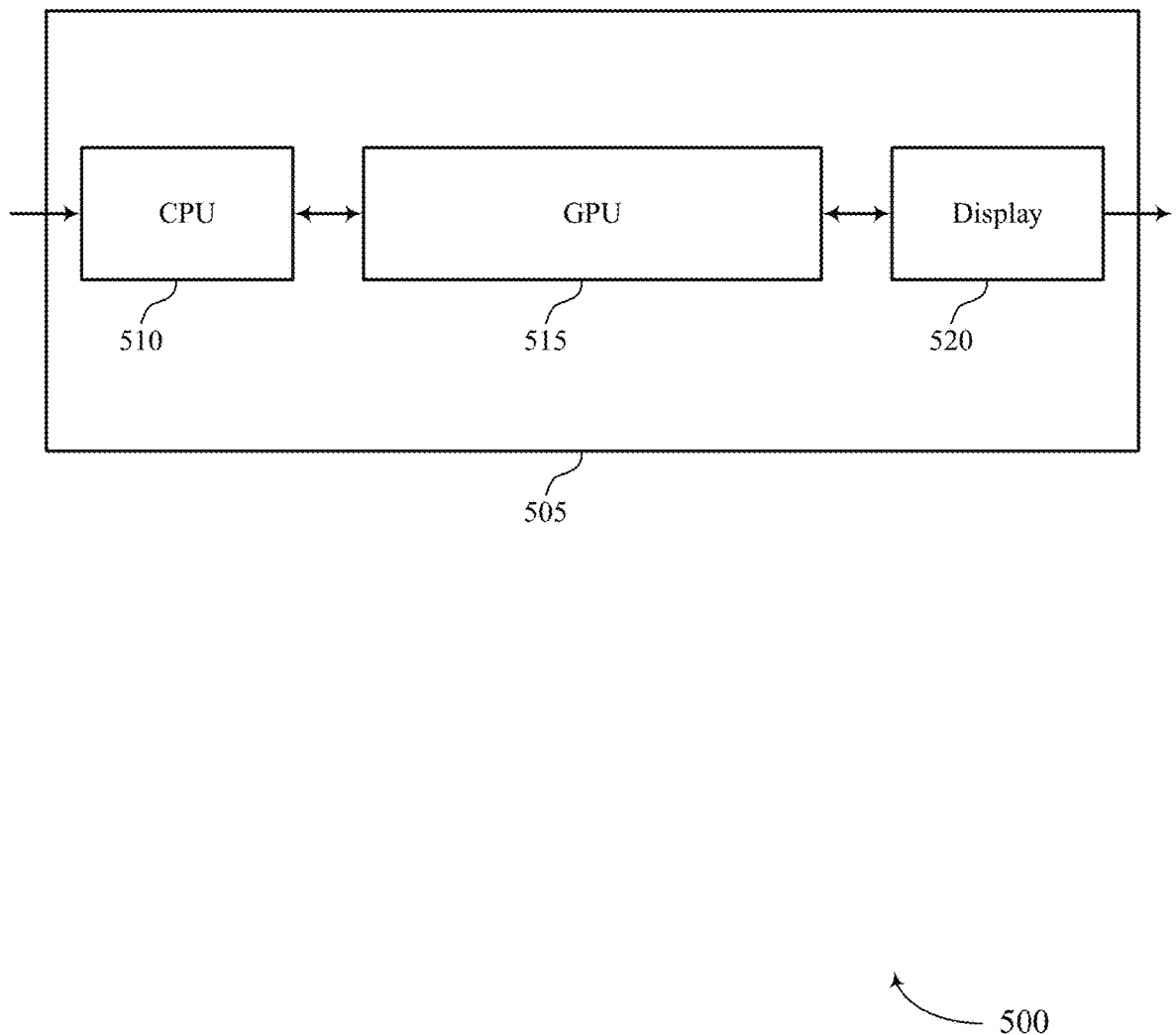
FIGS. 5 and 6 show block diagrams of devices that support out of order wave slot release for a terminated wave in accordance with aspects of the present disclosure.

FIG. 5 shows a block diagram 500 of a device 505 that supports out of order wave slot release for a terminated wave in accordance with aspects of the present disclosure. The device 505 may be an example of aspects of a device (e.g., a device 105 or device 200) as described herein. The device 505 may include a CPU 510, a GPU 515, and a display 520. The device 505 may also include a processor. Each of these components may be in communication with one another (e.g., via one or more buses).

CPU 510 may be an example of CPU 210 described with reference to FIG. 2. CPU 510 may execute one or more software applications, such as web browsers, graphical user interfaces, video games, or other applications involving graphics rendering for image depiction (e.g., via display 520). As described herein, CPU 510 may encounter a GPU program (e.g., a program suited for handling by GPU 515) when executing the one or more software applications. Accordingly, CPU 510 may submit rendering commands to GPU 515 (e.g., via a GPU driver containing a compiler for parsing API-based commands).

The GPU 515 may determine, based on a test operation, to terminate a first wave associated with a first slot of a set of slots, update a terminated wave bit associated with the first slot based on the determination to terminate the first wave, update a number of invocations field associated with the first wave based on the determination to terminate the first wave, release the first slot based on updating the terminated wave bit and the number of invocations field, and output the number of invocations field to a rendering backend of the device based on the terminated wave bit. The GPU 515 may be an example of aspects of the GPU 810 described herein.

The GPU 515, or its sub-components, may be implemented in hardware, code (e.g., software or firmware) executed by a processor, or any combination thereof. If implemented in code executed by a processor, the functions of the GPU 515, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The GPU 515, or its sub-components, may be physically located at various positions, including being distributed such that portions of functions are implemented at different physical locations by one or more physical components. In some examples, the GPU 515, or its sub-components, may be a separate and distinct component in accordance with various aspects of the present disclosure. In some examples, the GPU 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Display 520 may display content generated by other components of the device. Display 520 may be an example of display 245 as described with reference to FIG. 2. In some examples, display 520 may be connected with a display buffer which stores rendered data until an image is ready to be displayed (e.g., as described with reference to FIG. 2). The display 520 may illuminate according to signals or information generated by other components of the device 505. For example, the display 520 may receive display information (e.g., pixel mappings, display adjustments) from GPU 515, and may illuminate accordingly. The display 520 may represent a unit capable of displaying video, images, text or any other type of data for consumption by a viewer. Display 520 may include a liquid-crystal display (LCD), a light emitting diode (LED) display, an organic LED (OLED), an active-matrix OLED (AMOLED), or the like. In some cases, display 520 and an I/O controller (e.g., I/O controller 815) may be or represent aspects of a same component (e.g., a touchscreen) of device 505.

Figure 6:
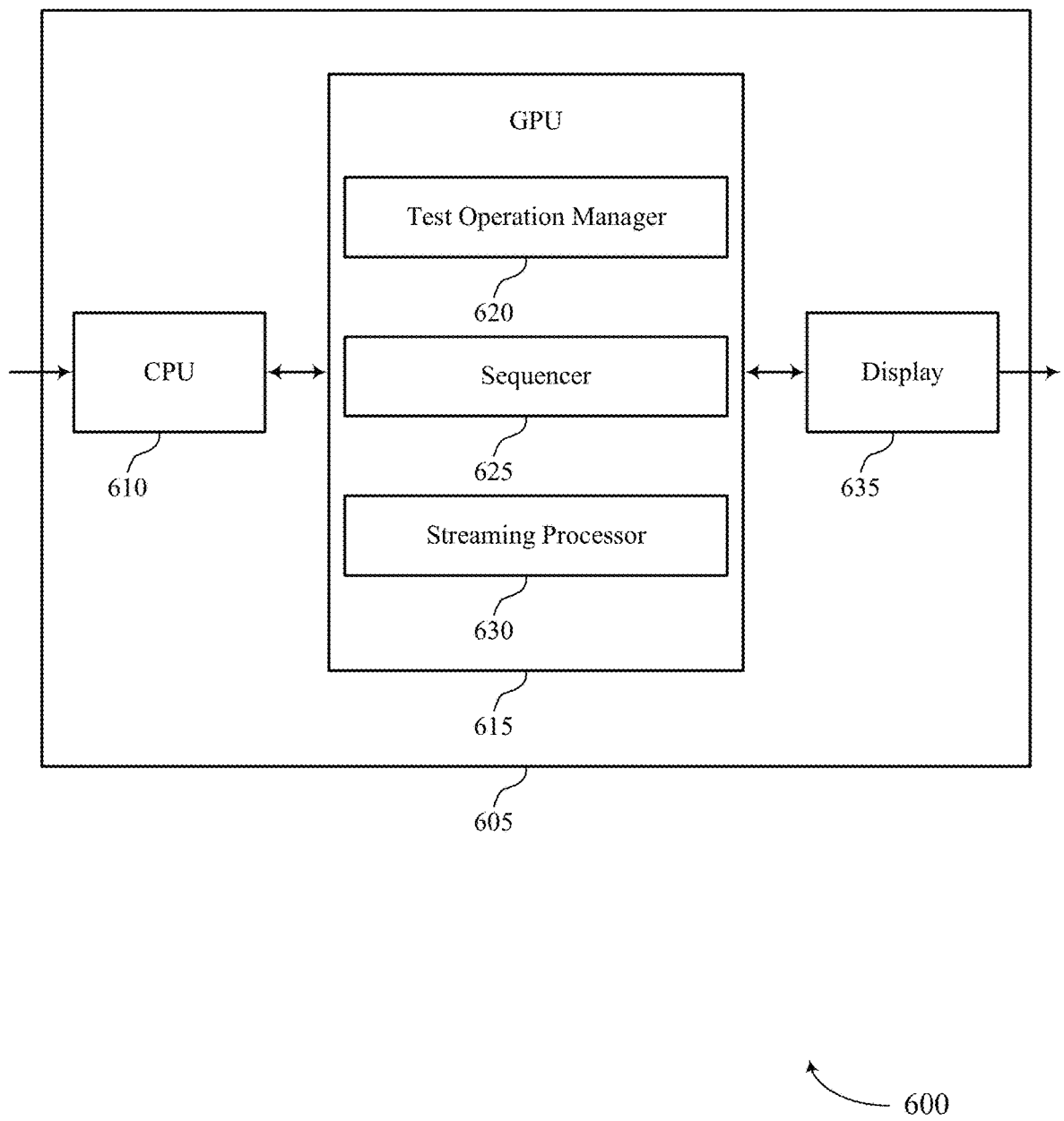

FIG. 6 shows a block diagram 600 of a device 605 that supports out of order wave slot release for a terminated wave in accordance with aspects of the present disclosure. The device 605 may be an example of aspects of a device 505, a device 105, or a device 200 as described herein. The device 605 may include a CPU 610, a GPU 615, and a display 635. The device 605 may also include a processor. Each of these components may be in communication with one another (e.g., via one or more buses).

CPU 610 may be an example of CPU 210 described with reference to FIG. 2. CPU 610 may execute one or more software applications, such as web browsers, graphical user interfaces, video games, or other applications involving graphics rendering for image depiction (e.g., via display 635). As described herein, CPU 610 may encounter a GPU program (e.g., a program suited for handling by GPU 615) when executing the one or more software applications. Accordingly, CPU 610 may submit rendering commands to GPU 615 (e.g., via a GPU driver containing a compiler for parsing API-based commands).

The GPU 615 may be an example of aspects of the GPU 515 as described herein. The GPU 615 may include a test operation manager 620, a sequencer 625, and a streaming processor 630. The GPU 615 may be an example of aspects of the GPU 810 described herein.

The test operation manager 620 may determine, based on a test operation, to terminate a first wave associated with a first slot of a set of slots. The sequencer 625 may update a terminated wave bit associated with the first slot based on the determination to terminate the first wave and update a number of invocations field associated with the first wave based on the determination to terminate the first wave. The streaming processor 630 may release the first slot based on updating the terminated wave bit and the number of invocations field and output the number of invocations field to a rendering backend of the device based on the terminated wave bit.

The display 635 may transmit signals generated by other components of the device 605. In some examples, the display 635 may be collocated with a CPU 610 in a transceiver module. For example, the display 635 may be an example of aspects of the transceiver 820 described with reference to FIG. 8. The display 635 may utilize a single antenna or a set of antennas.

Display 635 may display content generated by other components of the device. Display 635 may be an example of display 245 as described with reference to FIG. 2. In some examples, display 635 may be connected with a display buffer which stores rendered data until an image is ready to be displayed (e.g., as described with reference to FIG. 2). The display 635 may illuminate according to signals or information generated by other components of the device 605. For example, the display 635 may receive display information (e.g., pixel mappings, display adjustments) from GPU 615, and may illuminate accordingly. The display 635 may represent a unit capable of displaying video, images, text or any other type of data for consumption by a viewer. Display 635 may include a liquid-crystal display (LCD), a light emitting diode (LED) display, an organic LED (OLED), an active-matrix OLED (AMOLED), or the like. In some cases, display 635 and an I/O controller (e.g., I/O controller 815) may be or represent aspects of a same component (e.g., a touchscreen) of device 605.

Figure 7:
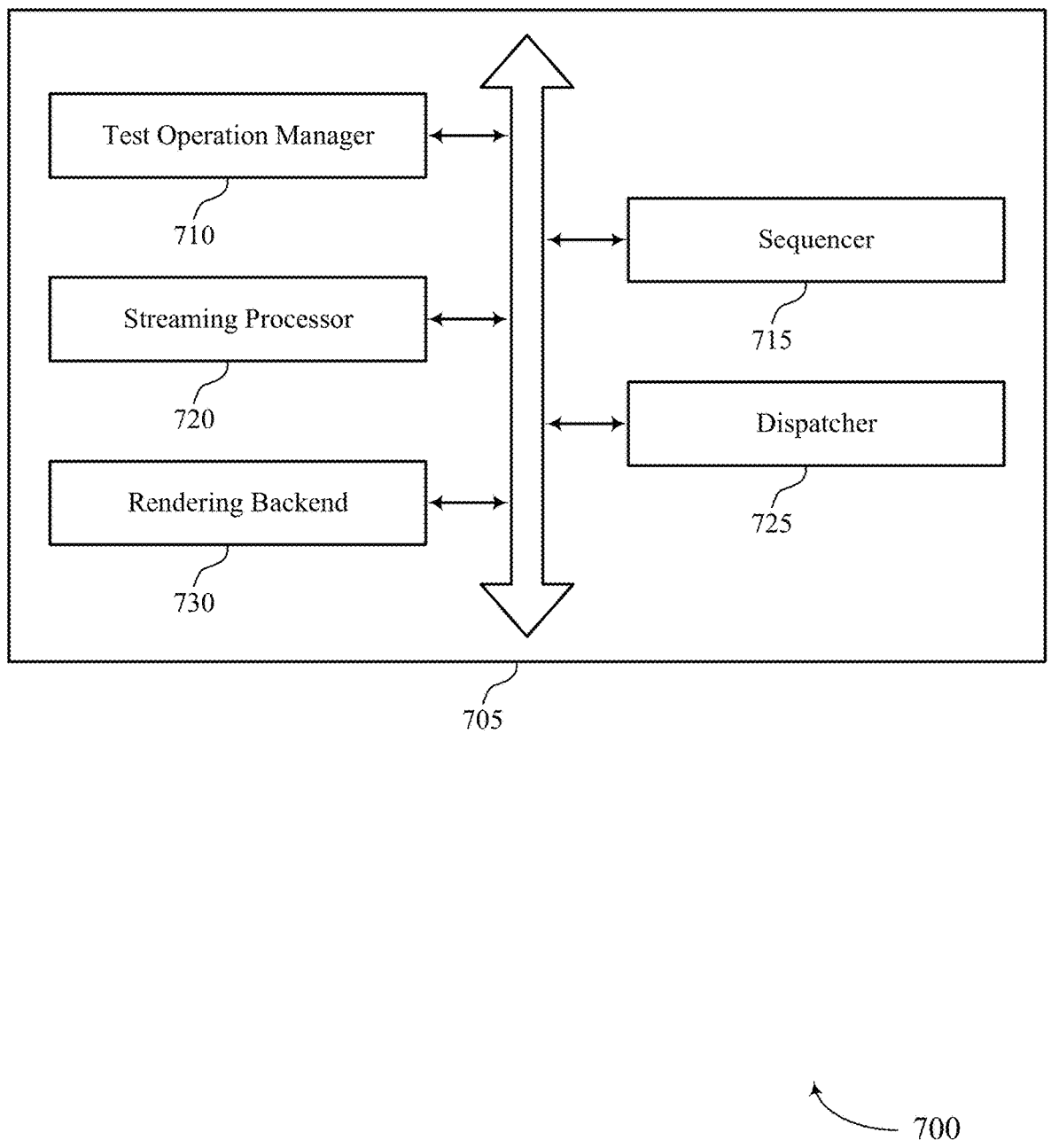
FIG. 7 shows a block diagram of a GPU that supports out of order wave slot release for a terminated wave in accordance with aspects of the present disclosure.

FIG. 7 shows a block diagram 700 of a GPU 705 that supports out of order wave slot release for a terminated wave in accordance with aspects of the present disclosure. The GPU 705 may be an example of aspects of a GPU 515, a GPU 615, or a GPU 810 described herein. The GPU 705 may include a test operation manager 710, a sequencer 715, a streaming processor 720, a dispatcher 725, and a rendering backend 730. Each of these modules may communicate, directly or indirectly, with one another (e.g., via one or more buses).

The test operation manager 710 may determine, based on a test operation, to terminate a first wave associated with a first slot of a set of slots. In some examples, the test operation manager 710 may perform the test operation for the first wave. In some examples, the test operation manager 710 may identify a number of pixels associated with the first wave based on the test operation.

In some examples, the test operation manager 710 may determine, based on the test operation, to terminate all pixels of the identified number of pixels, where the determination to terminate the first wave is based on the determination to terminate all pixels of the identified number of pixels. In some examples, the test operation manager 710 may perform a second test operation for the second wave. In some examples, the test operation manager 710 may identify a number of pixels associated with the second wave based on the second test operation, where the one or more pixels include a subset of the number of pixels associated with the second wave.

The sequencer 715 may update a terminated wave bit associated with the first slot based on the determination to terminate the first wave. In some examples, the sequencer 715 may update a number of invocations field associated with the first wave based on the determination to terminate the first wave. In some examples, the sequencer 715 may update the number of invocations field associated with the first wave to indicate the identified number of pixels. In some examples, the sequencer 715 may write the terminated wave bit and the number of invocations field to an entry of a sequence queue corresponding to the first wave. In some examples, the sequencer 715 may write the terminated wave bit and the number of invocations field to a first entry of a sequence queue corresponding to the first wave.

In some examples, the sequencer 715 may write the one or more pixels of the second wave to a second entry of the sequence queue corresponding to the second wave. In some examples, the sequencer 715 may write the one or more pixels of the third wave to a third entry of the sequence queue corresponding to the third wave. In some examples, the sequencer 715 may write the one or more pixels of the fourth wave to a fourth entry of the sequence queue corresponding to the fourth wave.

The streaming processor 720 may release the first slot based on updating the terminated wave bit and the number of invocations field. In some examples, the streaming processor 720 may output the number of invocations field to a rendering backend of the device based on the terminated wave bit. In some examples, the streaming processor 720 may process one or more pixels of a second wave using a second slot. In some examples, the streaming processor 720 may process one or more pixels of a third wave using the released first slot. In some examples, the streaming processor 720 may process one or more pixels of a fourth wave using a third slot. In some examples, the streaming processor 720 may output, by a streaming processor of the device, the first entry, the second entry, the third entry, and the fourth entry to the rendering backend of the device based on the sequence queue.

The dispatcher 725 may identify a wave order associated with a set of waves based on a sequence queue, where the set of waves includes at least the first wave. In some examples, the dispatcher 725 may identify the terminated wave bit based on the identified wave order, where the number of invocations field is output based on the identified terminated wave bit and the identified wave order. In some examples, the dispatcher 725 may identify the terminated wave bit based on the sequence queue, where the number of invocations field is output based on the identified terminated wave bit and the identified wave order. In some examples, the dispatcher 725 may output color information associated with the one or more pixels to the rendering backend of the device based on processing the one or more pixels of the second wave.

The rendering backend 730 may receive the output number of invocations field. In some examples, the rendering backend 730 may identify a pixel ordering for rendering based on the received number of invocations field. In some examples, the rendering backend 730 may identify a pixel ordering for rendering pixel information based on the number of invocations field associated with the first wave.

Figure 8:
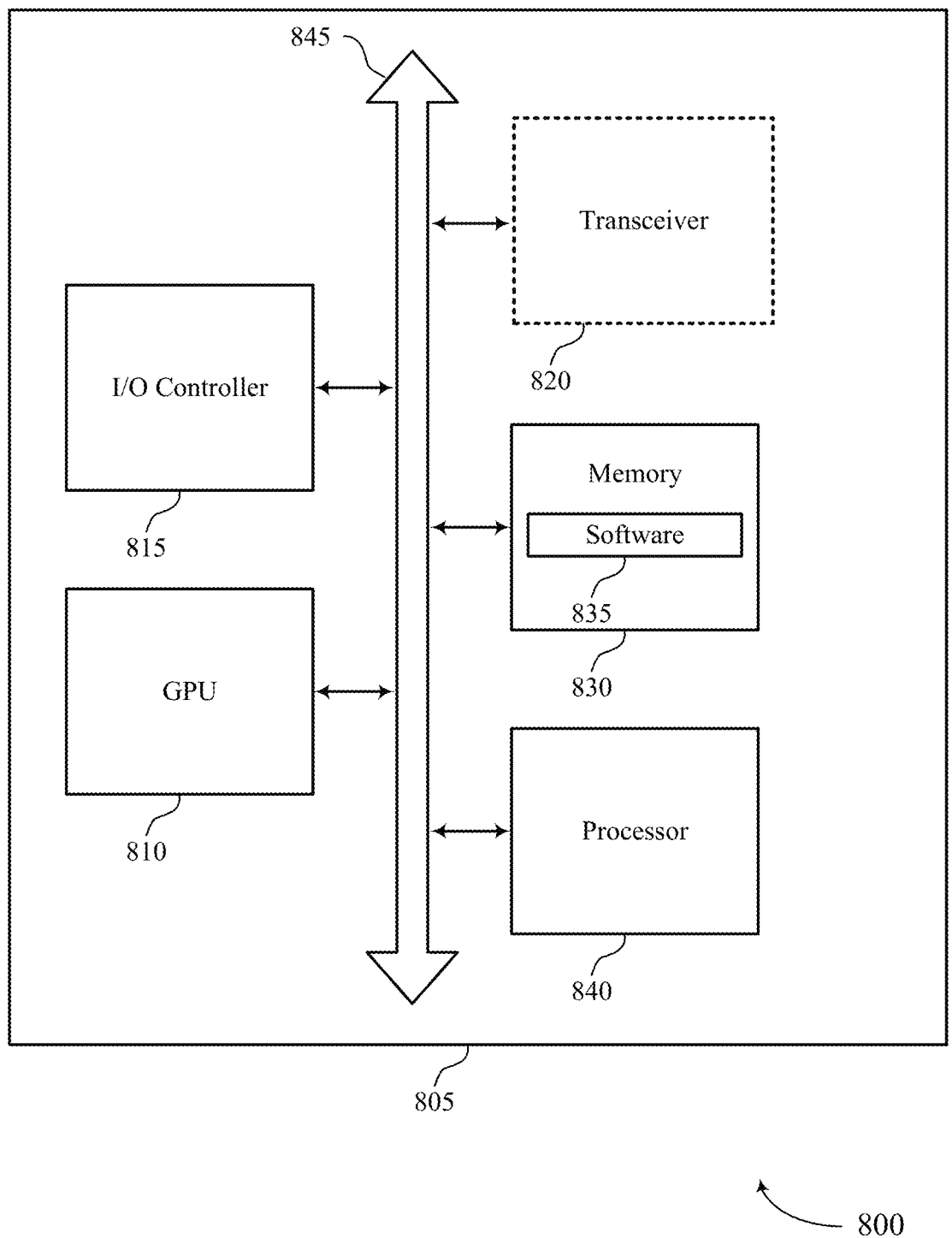
FIG. 8 shows a diagram of a system including a device that supports out of order wave slot release for a terminated wave in accordance with aspects of the present disclosure.

FIG. 8 shows a diagram of a system 800 including a device 805 that supports out of order wave slot release for a terminated wave in accordance with aspects of the present disclosure. The device 805 may be an example of or include the components of device 505, device 605, or a device as described herein. The device 805 may include components for bidirectional voice and data communications including components for transmitting and receiving communications, including a GPU 810, an I/O controller 815, memory 830, and a processor or CPU 840. In some cases, device 805 may include a transceiver 820. These components may be in electronic communication via one or more buses (e.g., bus 845).

The GPU 810 may determine, based on a test operation, to terminate a first wave associated with a first slot of a set of slots, update a terminated wave bit associated with the first slot based on the determination to terminate the first wave, update a number of invocations field associated with the first wave based on the determination to terminate the first wave, release the first slot based on updating the terminated wave bit and the number of invocations field, and output the number of invocations field to a rendering backend of the device based on the terminated wave bit.

CPU 840 may include an intelligent hardware device, (e.g., a general-purpose processor, a DSP, a microcontroller, an ASIC, an FPGA, a programmable logic device, a discrete gate or transistor logic component, a discrete hardware component, or any combination thereof). In some cases, CPU 840 may be configured to operate a memory array using a memory controller. In other cases, a memory controller may be integrated into CPU 840. CPU 840 may be configured to execute computer-readable instructions stored in a memory to perform various functions (e.g., functions or tasks supporting dynamic bin ordering for load synchronization).

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

In some cases, the GPU 810 and/or the CPU 840 may include an intelligent hardware device, (e.g., a general-purpose processor, a DSP, a microcontroller, an ASIC, an FPGA, a programmable logic device, a discrete gate or transistor logic component, a discrete hardware component, or any combination thereof). In some cases, the GPU 810 and/or the CPU 840 may be configured to operate a memory array using a memory controller. In other cases, a memory controller may be integrated into the GPU 810 and/or the CPU 840. The GPU 810 and/or the CPU 840 may be configured to execute computer-readable instructions stored in a memory (e.g., the memory 830) to cause the device 805 to perform various functions (e.g., functions or tasks supporting out of order wave slot release for a terminated wave).

The software 835 may include instructions to implement aspects of the present disclosure, including instructions to support image processing. The software 835 may be stored in a non-transitory computer-readable medium such as system memory or other type of memory. In some cases, the software 835 may not be directly executable by the CPU 840 but may cause a computer (e.g., when compiled and executed) to perform functions described herein.

Figure 9:
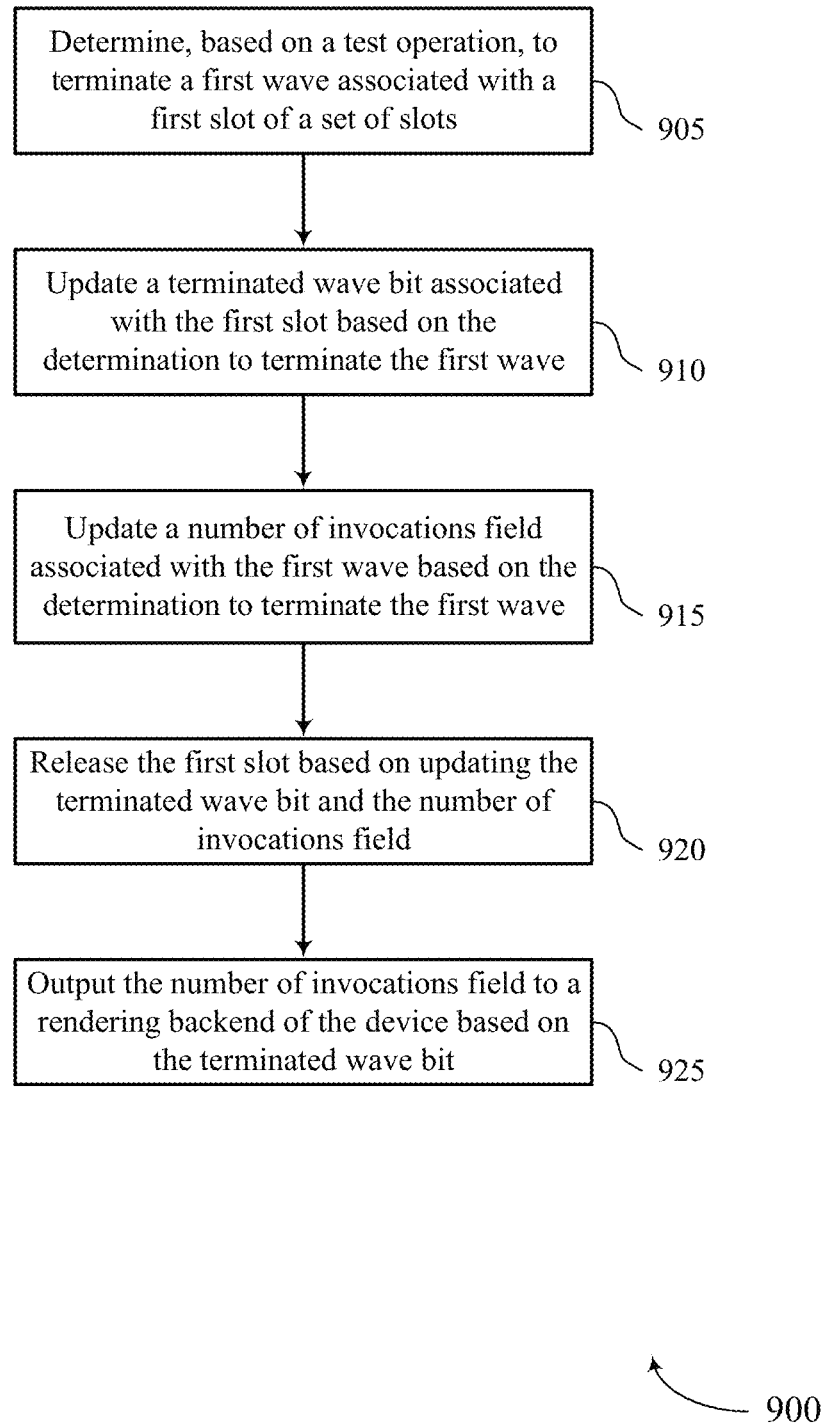
FIGS. 9 and 10 show flowcharts illustrating methods that support out of order wave slot release for a terminated wave in accordance with aspects of the present disclosure.

FIG. 9 shows a flowchart illustrating a method 900 that supports out of order wave slot release for a terminated wave in accordance with aspects of the present disclosure. The operations of method 900 may be implemented by a device or its components as described herein. For example, the operations of method 900 may be performed by a GPU as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 905, the device may determine, based on a test operation, to terminate a first wave associated with a first slot of a set of slots. The operations of 905 may be performed according to the methods described herein. In some examples, aspects of the operations of 905 may be performed by a test operation manager as described with reference to FIGS. 5 through 8.

At 910, the device may update a terminated wave bit associated with the first slot based on the determination to terminate the first wave. The operations of 910 may be performed according to the methods described herein. In some examples, aspects of the operations of 910 may be performed by a sequencer as described with reference to FIGS. 5 through 8.

At 915, the device may update a number of invocations field associated with the first wave based on the determination to terminate the first wave. The operations of 915 may be performed according to the methods described herein. In some examples, aspects of the operations of 915 may be performed by a sequencer as described with reference to FIGS. 5 through 8.

At 920, the device may release the first slot based on updating the terminated wave bit and the number of invocations field. The operations of 920 may be performed according to the methods described herein. In some examples, aspects of the operations of 920 may be performed by a streaming processor as described with reference to FIGS. 5 through 8.

At 925, the device may output the number of invocations field to a rendering backend of the device based on the terminated wave bit. The operations of 925 may be performed according to the methods described herein. In some examples, aspects of the operations of 925 may be performed by a streaming processor as described with reference to FIGS. 5 through 8.

Figure 10:
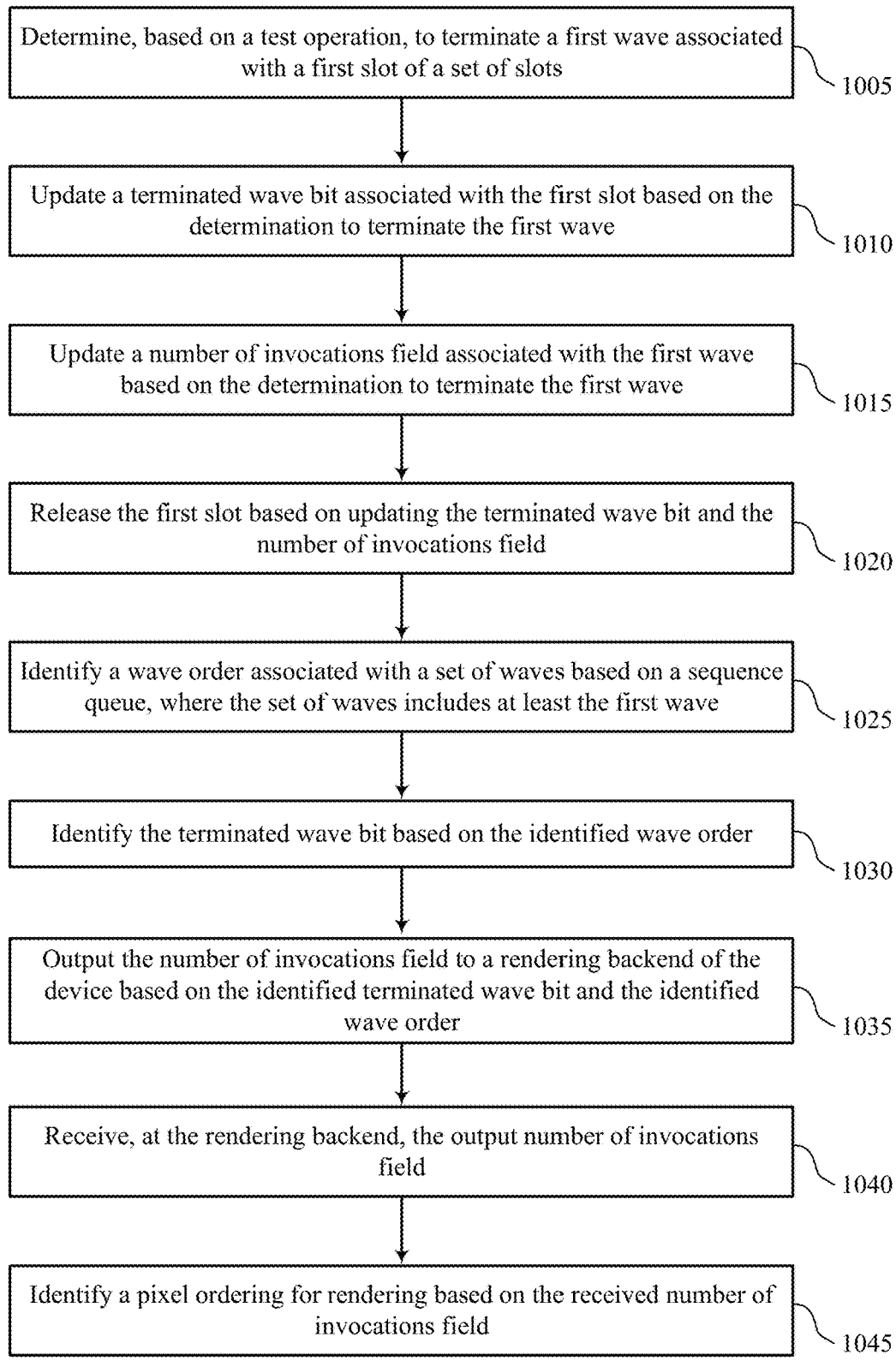

FIG. 10 shows a flowchart illustrating a method 1000 that supports out of order wave slot release for a terminated wave in accordance with aspects of the present disclosure. The operations of method 1000 may be implemented by a device or its components as described herein. For example, the operations of method 1000 may be performed by a GPU as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1005, the device may determine, based on a test operation, to terminate a first wave associated with a first slot of a set of slots. The operations of 1005 may be performed according to the methods described herein. In some examples, aspects of the operations of 1005 may be performed by a test operation manager as described with reference to FIGS. 5 through 8.

At 1010, the device may update a terminated wave bit associated with the first slot based on the determination to terminate the first wave. The operations of 1010 may be performed according to the methods described herein. In some examples, aspects of the operations of 1010 may be performed by a sequencer as described with reference to FIGS. 5 through 8.

At 1015, the device may update a number of invocations field associated with the first wave based on the determination to terminate the first wave. The operations of 1015 may be performed according to the methods described herein. In some examples, aspects of the operations of 1015 may be performed by a sequencer as described with reference to FIGS. 5 through 8.

At 1020, the device may release the first slot based on updating the terminated wave bit and the number of invocations field. The operations of 1020 may be performed according to the methods described herein. In some examples, aspects of the operations of 1020 may be performed by a streaming processor as described with reference to FIGS. 5 through 8.

At 1025, the device (e.g., a dispatcher of the device) may identify a wave order associated with a set of waves based on a sequence queue, where the set of waves includes at least the first wave. The operations of 1025 may be performed according to the methods described herein. In some examples, aspects of the operations of 1025 may be performed by a dispatcher as described with reference to FIGS. 5 through 8.

At 1030, the device (e.g., a dispatcher of the device) may identify the terminated wave bit based on the identified wave order, where the number of invocations field is output based on the identified terminated wave bit and the identified wave order. The operations of 1030 may be performed according to the methods described herein. In some examples, aspects of the operations of 1030 may be performed by a dispatcher as described with reference to FIGS. 5 through 8.

At 1035, the device may output the number of invocations field to a rendering backend of the device based on the identified terminated wave bit and the identified wave order. The operations of 1035 may be performed according to the methods described herein. In some examples, aspects of the operations of 1035 may be performed by a streaming processor as described with reference to FIGS. 5 through 8.

At 1040, the device (e.g., a rendering backend of the device) may receive the output number of invocations field. The operations of 1040 may be performed according to the methods described herein. In some examples, aspects of the operations of 1040 may be performed by a rendering backend as described with reference to FIGS. 5 through 8.

At 1045, the device (e.g., a rendering backend of the device) may identify a pixel ordering for rendering (e.g., by the rendering backend) based on the received number of invocations field. The operations of 1045 may be performed according to the methods described herein. In some examples, aspects of the operations of 1045 may be performed by a rendering backend as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a device, comprising:
determining, based at least in part on a test operation, to terminate a first wave associated with a first slot of a set of slots;
updating a terminated wave bit associated with the first slot based at least in part on the determination to terminate the first wave;
updating a number of invocations field associated with the first wave based at least in part on the determination to terminate the first wave;
releasing the first slot based at least in part on updating the terminated wave bit and the number of invocations field; and
outputting the number of invocations field to a rendering backend of the device based at least in part on the terminated wave bit.

2. The method of claim 1, further comprising:
performing the test operation for the first wave;
identifying a number of pixels associated with the first wave based at least in part on the test operation; and
determining, based at least in part on the test operation, to terminate all pixels of the identified number of pixels, wherein the determination to terminate the first wave is based at least in part on the determination to terminate all pixels of the identified number of pixels.

3. The method of claim 2, wherein updating the number of invocations field associated with the first wave comprises:
updating the number of invocations field associated with the first wave to indicate the identified number of pixels.

4. The method of claim 1, further comprising:
identifying a wave order associated with a set of waves based at least in part on a sequence queue, wherein the set of waves comprises at least the first wave; and
identifying the terminated wave bit based at least in part on the identified wave order, wherein the number of invocations field is output based at least in part on the identified terminated wave bit and the identified wave order.

5. The method of claim 1, wherein updating the terminated wave bit and the number of invocations field comprises:
writing the terminated wave bit and the number of invocations field to an entry of a sequence queue corresponding to the first wave.

6. The method of claim 5, further comprising:
identifying the terminated wave bit based at least in part on the sequence queue, wherein the number of invocations field is output based at least in part on the identified terminated wave bit and the identified wave order.

7. The method of claim 1, further comprising:
receiving, at the rendering backend, the output number of invocations field; and
identifying a pixel ordering for rendering based at least in part on the received number of invocations field.

8. The method of claim 1, further comprising:
processing one or more pixels of a second wave using a second slot;
processing one or more pixels of a third wave using the released first slot; and
processing one or more pixels of a fourth wave using a third slot.

9. The method of claim 8, further comprising:
writing the terminated wave bit and the number of invocations field to a first entry of a sequence queue corresponding to the first wave;
writing the one or more pixels of the second wave to a second entry of the sequence queue corresponding to the second wave;
writing the one or more pixels of the third wave to a third entry of the sequence queue corresponding to the third wave; and
writing the one or more pixels of the fourth wave to a fourth entry of the sequence queue corresponding to the fourth wave.

10. The method of claim 9, further comprising:
outputting, by a streaming processor of the device, the first entry, the second entry, the third entry, and the fourth entry to the rendering backend of the device based at least in part on the sequence queue; and
identifying a pixel ordering for rendering pixel information based at least in part on the number of invocations field associated with the first wave.

11. The method of claim 8, further comprising:
performing a second test operation for the second wave; and
identifying a number of pixels associated with the second wave based at least in part on the second test operation, wherein the one or more pixels comprise a subset of the number of pixels associated with the second wave.

12. The method of claim 11, further comprising:
outputting color information associated with the one or more pixels to the rendering backend of the device based at least in part on processing the one or more pixels of the second wave.

13. An apparatus for image processing at a device, comprising:
a processor,
memory coupled with the processor; and
instructions stored in the memory and executable by the processor to cause the apparatus to:
determine, based at least in part on a test operation, to terminate a first wave associated with a first slot of a set of slots;
update a terminated wave bit associated with the first slot based at least in part on the determination to terminate the first wave;
update a number of invocations field associated with the first wave based at least in part on the determination to terminate the first wave;
release the first slot based at least in part on updating the terminated wave bit and the number of invocations field; and
output the number of invocations field to a rendering backend of the device based at least in part on the terminated wave bit.

14. The apparatus of claim 13, wherein the instructions are further executable by the processor to cause the apparatus to:
perform the test operation for the first wave;
identify a number of pixels associated with the first wave based at least in part on the test operation; and
determine, based at least in part on the test operation, to terminate all pixels of the identified number of pixels, wherein the determination to terminate the first wave is based at least in part on the determination to terminate all pixels of the identified number of pixels.

15. The apparatus of claim 14, wherein the instructions to update the number of invocations field associated with the first wave are executable by the processor to cause the apparatus to:
update the number of invocations field associated with the first wave to indicate the identified number of pixels.

16. The apparatus of claim 13, wherein the instructions are further executable by the processor to cause the apparatus to:
identify a wave order associated with a set of waves based at least in part on a sequence queue, wherein the set of waves comprises at least the first wave; and
identify the terminated wave bit based at least in part on the identified wave order, wherein the number of invocations field is output based at least in part on the identified terminated wave bit and the identified wave order.

17. The apparatus of claim 13, wherein the instructions to update the terminated wave bit and the number of invocations field are executable by the processor to cause the apparatus to:
write the terminated wave bit and the number of invocations field to an entry of a sequence queue corresponding to the first wave.

18. The apparatus of claim 17, wherein the instructions are further executable by the processor to cause the apparatus to:
identify the terminated wave bit based at least in part on the sequence queue, wherein the number of invocations field is output based at least in part on the identified terminated wave bit and the identified wave order.

19. The apparatus of claim 13, wherein the instructions are further executable by the processor to cause the apparatus to:
receive, at the rendering backend, the output number of invocations field; and
identify a pixel ordering for rendering based at least in part on the received number of invocations field.

20. An apparatus for image processing at a device, comprising:
means for determining, based at least in part on a test operation, to terminate a first wave associated with a first slot of a set of slots;
means for updating a terminated wave bit associated with the first slot based at least in part on the determination to terminate the first wave;
means for updating a number of invocations field associated with the first wave based at least in part on the determination to terminate the first wave;
means for releasing the first slot based at least in part on updating the terminated wave bit and the number of invocations field; and
means for outputting the number of invocations field to a rendering backend of the device based at least in part on the terminated wave bit.

* * * * *